US012197359B2

(12) United States Patent
Venkataramani et al.

(10) Patent No.: US 12,197,359 B2
(45) Date of Patent: Jan. 14, 2025

(54) MEMORY REGISTRATION FOR OPTIMIZING RDMA PERFORMANCE IN HYPERCONVERGED COMPUTING ENVIRONMENTS

(71) Applicant: Nutanix, Inc., San Jose, CA (US)

(72) Inventors: Hema Venkataramani, San Jose, CA (US); Felipe Franciosi, Cambridge (GB); Sreejith Mohanan, San Jose, CA (US); Alok Nemchand Kataria, Pune (IN); Umang Sureshkumar Patel, Ahmedabad (IN)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/163,210

(22) Filed: Jan. 29, 2021

(65) Prior Publication Data

US 2022/0179675 A1 Jun. 9, 2022

(30) Foreign Application Priority Data

Dec. 3, 2020 (IN) .............................. 202041052663

(51) Int. Cl.
*G06F 3/06* (2006.01)
*G06F 9/455* (2018.01)
(Continued)

(52) U.S. Cl.
CPC .............. *G06F 13/28* (2013.01); *G06F 3/061* (2013.01); *G06F 3/0611* (2013.01);
(Continued)

(58) Field of Classification Search
CPC .... G06F 3/0611; G06F 3/0664; G06F 3/0665; G06F 3/067; G06F 9/45545;
(Continued)

(56) References Cited

U.S. PATENT DOCUMENTS

| 7,975,260 B1 | 7/2011 | Conover |
| 8,131,814 B1 | 3/2012 | Schlansker et al. |

(Continued)

FOREIGN PATENT DOCUMENTS

| CN | 102571925 B | 8/2014 |
| WO | WO 2020155417 A1 | 8/2020 |

OTHER PUBLICATIONS

MacArthur, Patrick. Userspace RDMA Verbs on Commodity Hardware using DPDK. [online] IEEE., pp. 103-110. Retrieved From the Internet <https://ieeexplore.ieee.org/stamp/stamp.jsp?arnumber=8071063> (Year: 2017).*

(Continued)

*Primary Examiner* — Emerson C Puente
*Assistant Examiner* — Jonathan R Labud
(74) *Attorney, Agent, or Firm* — Vista IP Law Group, LLP

(57) ABSTRACT

Methods, systems, and computer program products for high-performance cluster computing. Multiple components are operatively interconnected to carry out operations for high-performance RDMA I/O transfers over an RDMA NIC. A virtual machine of a virtualization environment initiates a first I/O call to an HCI storage pool controller using RDMA. Responsive to the first I/O call, a second I/O call is initiated from the HCI storage pool controller to a storage device of an HCI storage pool. The first I/O call to the HCI storage pool controller is implemented through a first virtual function of an RDMA NIC that is exposed in the user space of the virtualization environment. Prior to the first RDMA I/O call, a contiguous unit of memory to use in an RDMA I/O transfer is registered with the RDMA NIC. The contiguous unit of memory comprises memory that is registered using non-RDMA paths such as TCP or iSCSI.

30 Claims, 16 Drawing Sheets

(51) Int. Cl.
*G06F 9/54* (2006.01)
*G06F 13/28* (2006.01)

(52) U.S. Cl.
CPC .......... *G06F 3/0655* (2013.01); *G06F 3/0664* (2013.01); *G06F 3/0665* (2013.01); *G06F 3/067* (2013.01); *G06F 9/45545* (2013.01); *G06F 9/45558* (2013.01); *G06F 9/545* (2013.01); *G06F 2009/45579* (2013.01); *G06F 2009/45583* (2013.01); *G06F 2213/28* (2013.01)

(58) Field of Classification Search
CPC ................. G06F 9/45558; G06F 9/545; G06F 2009/45583; G06F 2009/45579
See application file for complete search history.

(56) References Cited

U.S. PATENT DOCUMENTS

| | | | |
|---|---|---|---|
| 8,549,518 | B1 | 10/2013 | Aron et al. |
| 8,601,473 | B1 | 12/2013 | Aron et al. |
| 8,850,130 | B1 | 9/2014 | Aron et al. |
| 9,665,534 | B2 | 5/2017 | Tsirkin |
| 9,772,866 | B1 | 9/2017 | Aron et al. |
| 9,953,006 | B2 | 4/2018 | Amit et al. |
| 10,824,369 | B2 | 11/2020 | Venkataramani et al. |
| 11,086,524 | B1 | 8/2021 | Sun et al. |
| 2002/0073257 | A1* | 6/2002 | Beukema ............ H04L 12/4633 710/105 |
| 2004/0093389 | A1 | 5/2004 | Mohamed et al. |
| 2006/0045098 | A1* | 3/2006 | Krause .................. H04L 69/162 370/396 |
| 2006/0047771 | A1 | 3/2006 | Blackmore et al. |
| 2007/0288828 | A1 | 12/2007 | Biran et al. |
| 2010/0083247 | A1 | 4/2010 | Kanevsky et al. |
| 2010/0161879 | A1* | 6/2010 | Nation ................ G06F 12/0813 711/170 |
| 2011/0029730 | A1 | 2/2011 | Durocher et al. |
| 2011/0119665 | A1* | 5/2011 | Santos ................ G06F 9/45558 718/1 |
| 2012/0210066 | A1 | 8/2012 | Joshi et al. |
| 2012/0278295 | A1 | 11/2012 | Hildebrand et al. |
| 2013/0151646 | A1 | 6/2013 | Chidambaram et al. |
| 2014/0337456 | A1* | 11/2014 | Chawla ............. G06F 15/17331 709/212 |
| 2015/0039846 | A1 | 2/2015 | Simon et al. |
| 2015/0186330 | A1 | 7/2015 | Gao et al. |
| 2016/0072906 | A1 | 3/2016 | Shuler et al. |
| 2016/0299856 | A1 | 10/2016 | Fruchter et al. |
| 2016/0350260 | A1 | 12/2016 | Tsirkin et al. |
| 2016/0350261 | A1 | 12/2016 | Tsirkin et al. |
| 2017/0075856 | A1 | 3/2017 | Suzue et al. |
| 2017/0149890 | A1* | 5/2017 | Shamis ............... H04L 67/1097 |
| 2017/0199842 | A1 | 7/2017 | England et al. |
| 2018/0032249 | A1 | 2/2018 | Makhervaks et al. |
| 2018/0335956 | A1 | 11/2018 | Iyer et al. |
| 2018/0349260 | A1 | 12/2018 | Kurmus et al. |
| 2019/0124395 | A1* | 4/2019 | Lin .................... H04N 21/4331 |
| 2019/0129845 | A1 | 5/2019 | Gidra et al. |
| 2020/0236089 | A1* | 7/2020 | Li ....................... H04L 67/1097 |
| 2020/0244521 | A1 | 7/2020 | Patel et al. |
| 2020/0326971 | A1* | 10/2020 | Yang ................... G06F 9/45533 |
| 2020/0364100 | A1 | 11/2020 | Shah et al. |
| 2021/0073198 | A1 | 3/2021 | Srinivasan et al. |
| 2021/0081352 | A1* | 3/2021 | Yang ................... G06F 13/1668 |
| 2021/0103403 | A1* | 4/2021 | He ........................ G06F 3/0664 |
| 2021/0191777 | A1 | 6/2021 | Roozbeh et al. |
| 2021/0349820 | A1 | 11/2021 | Kutch et al. |
| 2022/0156116 | A1* | 5/2022 | Yardeni ................ G06F 9/4868 |
| 2022/0232074 | A1* | 7/2022 | Scaglione ........... H04L 67/1097 |

OTHER PUBLICATIONS

Ko, M. et al., "iSCSI Extensions for RDMA Specification (Version 1.0)", (Jul. 2003).

Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Cano, I. et al., "Curator: Self-Managing Storage for Enterprise Clusters", 14th USENIX Symposium on Networked Systems Design and Implementation, NSDI '17, (Mar. 27, 2017).
Liu, J. et al., "Evaluating the Impact of RDMA on Storage I/O over InfiniBand", Published 2004.
Metzler, B., "A Hybrid I/O Virtualization Framework for RDMA-capable Network Interfaces", VEE '15, (Mar. 2015).
"Configuring Mellanox RDMA I/O Drivers for ESXi 5.x (Partner Verified and Support) (2058261)", Vmware Customer Connect, (Jan. 29, 2014). URL: https://kb.vmware.com/s/article/2058261.
Non-Final Office Action dated Oct. 4, 2021 for related U.S. Appl. No. 17/163,031.
Poitras, Steven. "The Nutanix Bible" (Jul. 9, 2019), from https://nutanixbible.com/ (Publication date based on indicated capture date by Archive.org; first publication date unknown).
Poitras, Steven. "The Nutanix Bible" (Feb. 3, 2020), from https://nutanixbible.com/ (Publication date based on indicated capture date by Archive.org; first publication date unknown).
Poitras, Steven. "The Nutanix Bible" (Aug. 1, 2020), from https://nutanixbible.com/ (Publication date based on indicated capture date by Archive.org; first publication date unknown).
Poitras, Steven. "The Nutanix Bible" (Jan. 30, 2021), from https://nutanixbible.com/ (Publication date based on indicated capture date by Archive.org; first publication date unknown).
Notice of Allowance for U.S. Appl. No. 17/163,031 dated Apr. 20, 2022.
Poitras, Steven. "The Nutanix Bible" (Sep. 9, 2022), from https://nutanixbible.com/ (Publication date based on indicated capture date by Archive.org; first publication date unknown).
"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.
Non-Final Office Action for U.S. Appl. No. 17/139,698 dated Sep. 29, 2022.
Wooddall, T. et al., "High Performance RDMA Protocols in HPC", Conference: *Proceedings of the 13th European PVM/MPI*, (Sep. 2006).
Viviano, A. et al., "Caching Registered Memory", Microsoft Docs, (Apr. 20, 2017).

(56) References Cited

OTHER PUBLICATIONS

Wyckoff, P. et al., "Memory Registration Caching Correctness", *CCGrid 2005. IEEE International Symposium on Cluster Computing and the Grid, 2005*, (May 9-12, 2005).
Li, F. et al., "Accelerating Relational Databases by Leveraging Remote Memory and RDMA", *SIGMOD'16*, (Jun. 26-Jul. 1, 2016).
Li, D. et al., "Scalable Memory Registration for High Performance Networks Using Helper Threads", *Proceedings of the 8th ACM International Conference on Computing Frontiers (CF)*, (May 3-5, 2011).
Final Office Action dated Mar. 22, 2023 for U.S. Appl. No. 17/139,698.
Non-Final Office Action dated Oct. 12, 2023 for U.S. Appl. No. 17/139,698.
Final Office Action for U.S. Appl. No. 17/139,698 dated Feb. 21, 2024.
Michael, M., "Scalable Lock-Free Dynamic Memory Allocation," PLDI'04, Jun. 9-11, 2004, Washington, DC, USA, dated 2004.
"Configure iSER with ESXi," VMWare Docs, URL: https://docs.vmware.com/en/VMware-vSphere/7.0/com.vmware.vsphere.storage.doc/GUID-679D1419-BF9D-4E10-8598-F23205E8AB0F.html, dated Jul. 23, 2020.
"Enable the VMware iSER Adapter," VMWare Docs, URL: https://docs.vmware.com/en/VMware-vSphere/6.7/com.vmware.vsphere.storage.doc/GUID-4F2C10BB-3705-4040-BFDE-A190FE273060.html, dated May 31, 2019.
Brodeur, J., "vSphere with iSER—How to release the full potential of your iSCSI storage!," VMWare—VROOM! Performance Blog, dated Aug. 27, 2018.
"Using iSER Protocol with ESXi," VMWare Docs, URL: https://docs.vmware.com/en/VMware-vSphere/7.0/com.vmware.vsphere.storage.doc/GUID-2B5FDE0F-3B76-408D-A64D-730B70BCA0A0.html#GUID-2B5FDE0F-3B76-408D-A64D-730B70BCA0A0, dated Jul. 22, 2020.
"Network Requirements for RDMA over Converged Ethernet," VMWare Docs, URL: https://docs.vmware.com/en/VMware-vSphere/6.7/com.vmware.vsphere.networking.doc/GUID-E4ECDD76-75D6-4974-A225-04D5D117A9CF.html, dated May 31, 2019.
"VMware vSAN Design Guide," URL: https://web.archive.org/web/20201106104438/https:/core.vmware.com/resource/vmware-vsan-design-guide#sec2-sub5, date found via Internet Archive as Nov. 6, 2020.
"Cisco UCS Manager Configuration Guide for RDMA over Converged Ethernet (RoCE) Version 2, Release 4.1," Cisco, dated Dec. 14, 2020.
Notice of Allowance for U.S. Appl. No. 17/139,698 dated Aug. 23, 2024.

\* cited by examiner

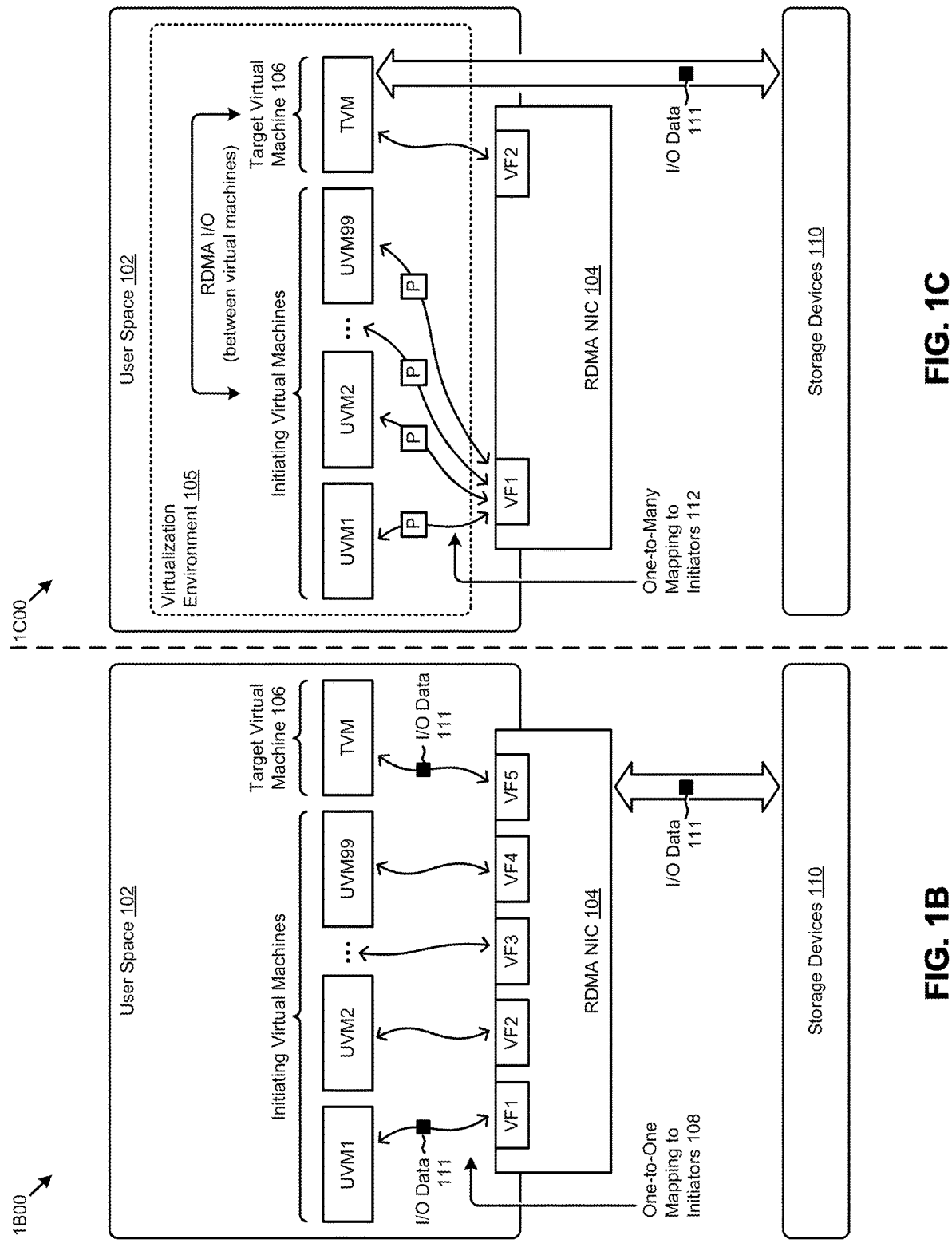

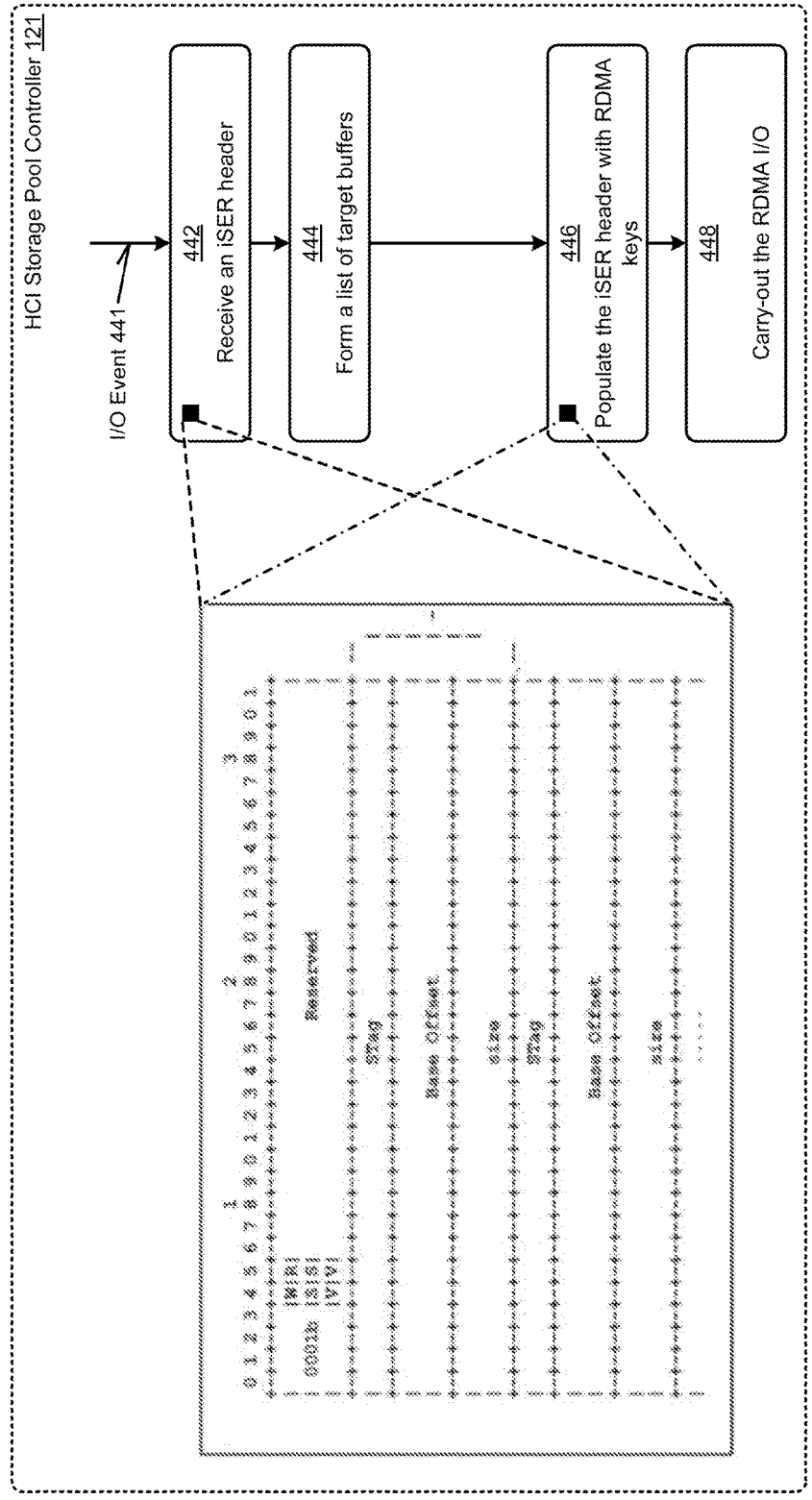
FIG. 4B1

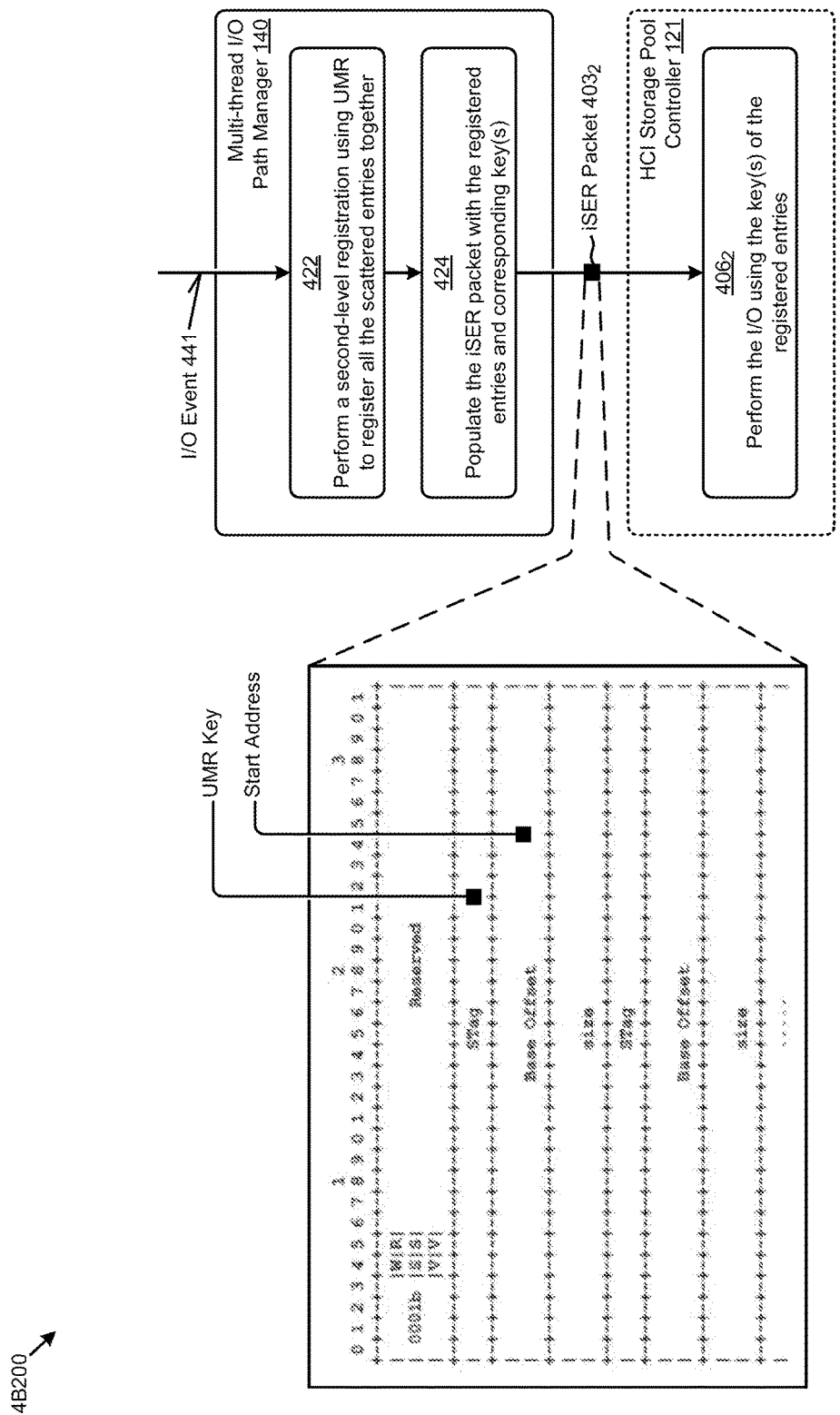
FIG. 4B2

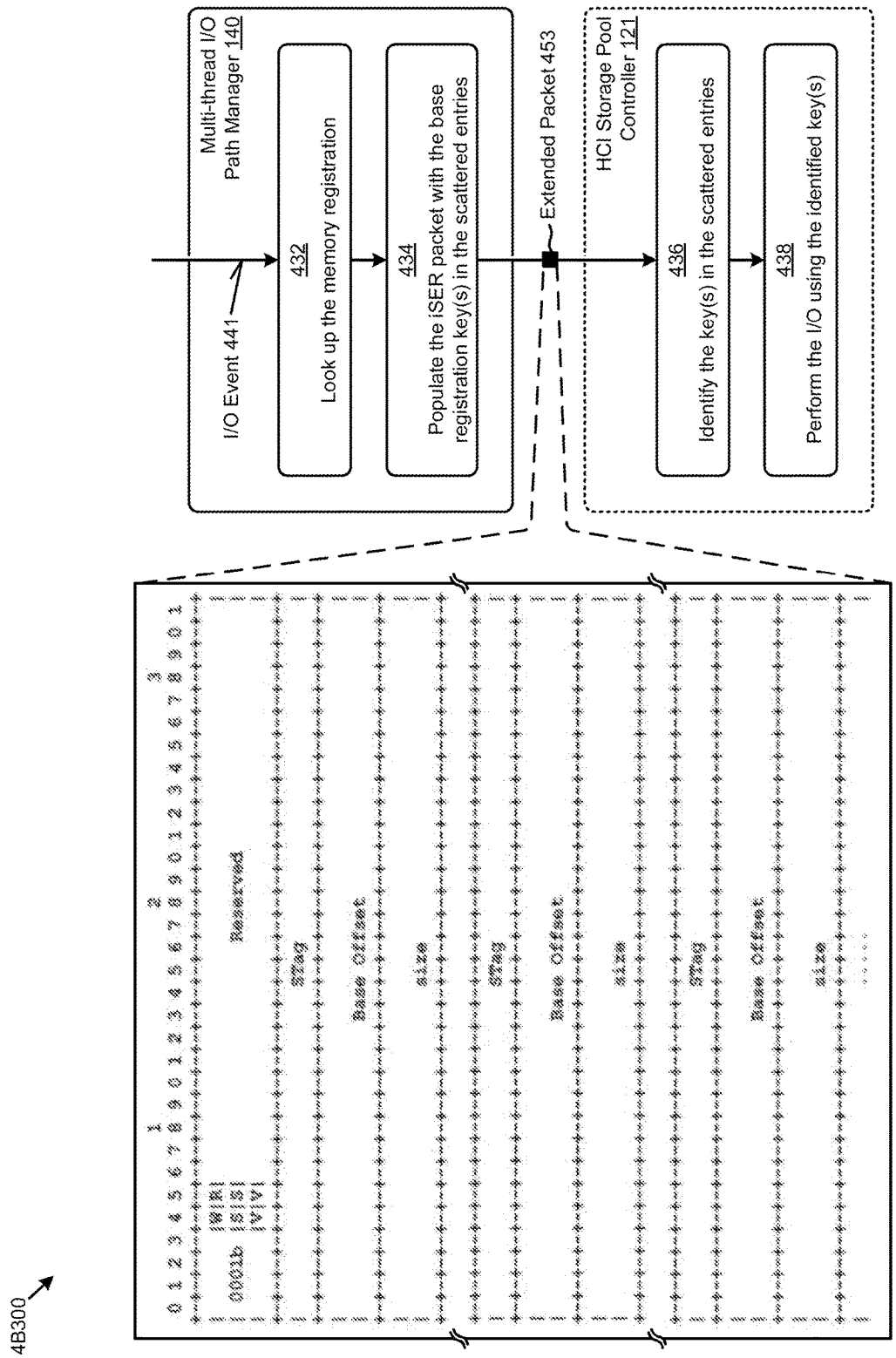
FIG. 4B3

MEMORY REGISTRATION FOR OPTIMIZING RDMA PERFORMANCE IN HYPERCONVERGED COMPUTING ENVIRONMENTS

RELATED APPLICATIONS

The present application claims the benefit of priority to India Provisional Patent Application Ser. No. 202041052663 titled "DYNAMIC RDMA CONNECTION MANAGEMENT FOR ACCELERATING TRAFFIC BETWEEN VIRTUAL MACHINES" filed on Dec. 3, 2020, which is hereby incorporated by reference in its entirety; and the present application is related to co-pending U.S. patent application Ser. No. 17/163,031 titled "OPTIMIZING RDMA PERFORMANCE IN HYPERCONVERGED COMPUTING ENVIRONMENTS" filed on even date herewith, which is hereby incorporated by reference in its entirety.

TECHNICAL FIELD

This disclosure relates to cluster computing, and more particularly to techniques for optimizing remote direct memory access (RDMA) performance.

BACKGROUND

In many settings (e.g., in virtualized computing systems) computing entities communicate between themselves using network packets. Such network packets may correspond to any of a variety of networking protocols, such as TCP, UDP, etc. In some cases storage resources managed by a particular virtual machine are the ultimate target of a communication. In such cases, the network packets may correspond storage I/O (input/output or IO) operations that in turn correspond to any of a variety of storage networking protocols, such as NFS, SMB, iSCSI, etc.

When the aforementioned computing entities are engaged in such communications, the packets are routed through a kernel. The kernel in turn performs the protocol processing through the kernel's protocol stack, and therein processes the packet for communication to its intended destination.

Historically, such protocol processing through the kernel's protocol stack represented a relatively small portion of the overall time to process an I/O operation. Specifically, the overall amount of time to process an I/O operation was dominated by the latency introduced by hard disk drives (e.g., spinning media). However, as hard disk drive technology becomes more and more improved (e.g., exhibiting smaller and smaller latencies), and as new technologies for storage media (e.g., solid state drives) are used (e.g., virtualized computing systems), the amount of time spent in the kernel for protocol processing becomes a larger and larger portion of the overall time to process an I/O operation. More specifically, the portion of time for registering memory to be used in RDMA I/O operations becomes a larger and larger portion of the overall time to process an I/O operation.

Unfortunately, all known techniques for handling storage I/O exhibit one or more performance-related deficiencies. What is needed is a way to perform RDMA memory registration in a manner that eliminates or reduces the expense of memory registration operations in the RDMA NIC data path—and in a manner that does not require user configuration.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for optimizing RDMA performance, which techniques advance the relevant technologies to address technological issues with legacy approaches. More specifically, the present disclosure describes techniques used in systems, methods, and in computer program products for reducing or eliminating overhead-incurring operations in the RDMA path.

Certain embodiments are directed to technological solutions for configuring RDMA connections between virtual machines so as to facilitate high-performance memory registration for RDMA I/O operations without requiring user intervention. Certain embodiments are directed to technological solutions for managing RDMA I/O operations between virtual machines so as to facilitate high-performance data I/O communications between a user virtual machine and a storage pool controller.

The disclosed embodiments modify and improve over legacy approaches. In particular, the herein-disclosed techniques provide technical solutions that address the technical problems attendant to reducing or eliminating overhead-incurring operations in the RDMA when communicating storage commands between virtual machines. Such technical solutions involve specific implementations (i.e., data organization, data communication paths, module-to-module interrelationships, etc.) that relate to the software arts for improving computer functionality. Various applications of the herein-disclosed improvements in computer functionality serve to reduce demand for computer memory, reduce demand for computer processing power, reduce network bandwidth usage, and reduce demand for intercomponent communication. For example, by reducing or eliminating overhead-incurring operations in the RDMA path, CPU cycles demanded are significantly reduced as compared to the CPU cycles that would be needed but for practice of the herein-disclosed techniques. The data structures as disclosed herein and their use serve to reduce both memory usage and CPU cycles as compared to alternative approaches.

Many of the herein-disclosed embodiments for configuring RDMA connections between virtual machines so as to facilitate high-performance memory registration for RDMA I/O operations are technological solutions pertaining to technological problems that arise in the hardware and software arts that underlie computing clusters. Aspects of the present disclosure achieve performance and other improvements in peripheral technical fields including, but not limited to, hyperconverged computing platform management and high availability computing.

Some embodiments include a sequence of instructions that are stored on a non-transitory computer readable medium. Such a sequence of instructions, when stored in memory and executed by one or more processors, causes the one or more processors to perform high-performance RDMA I/O operations without requiring user intervention.

Some embodiments include the aforementioned sequence of instructions that are stored in a memory, which memory is interfaced to one or more processors such that the one or more processors can execute the sequence of instructions to cause the one or more processors to implement acts for configuring RDMA connections between virtual machines so as to facilitate high-performance memory registration for RDMA I/O operations.

In various embodiments, any combinations of any of the above can be organized to perform any variation of steps or acts, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 1B shows an example system that uses a one-to-one mapping of virtual functions of an RDMA NIC to respective initiator virtual machines when implementing a kernel-independent data path between virtual machines, according to an embodiment.

FIG. 1C shows an example system that uses a one-to-many mapping of a single virtual function of an RDMA NIC to multiple initiator virtual machines when implementing a kernel-independent data path between virtual machines, according to an embodiment.

FIG. 4A, FIG. 4B1, FIG. 4B2, and FIG. 4B3 present several alternative memory registration techniques as used in systems that exhibit reduced or eliminated RDMA overhead, according to an embodiment.

DETAILED DESCRIPTION

Figure 1A:
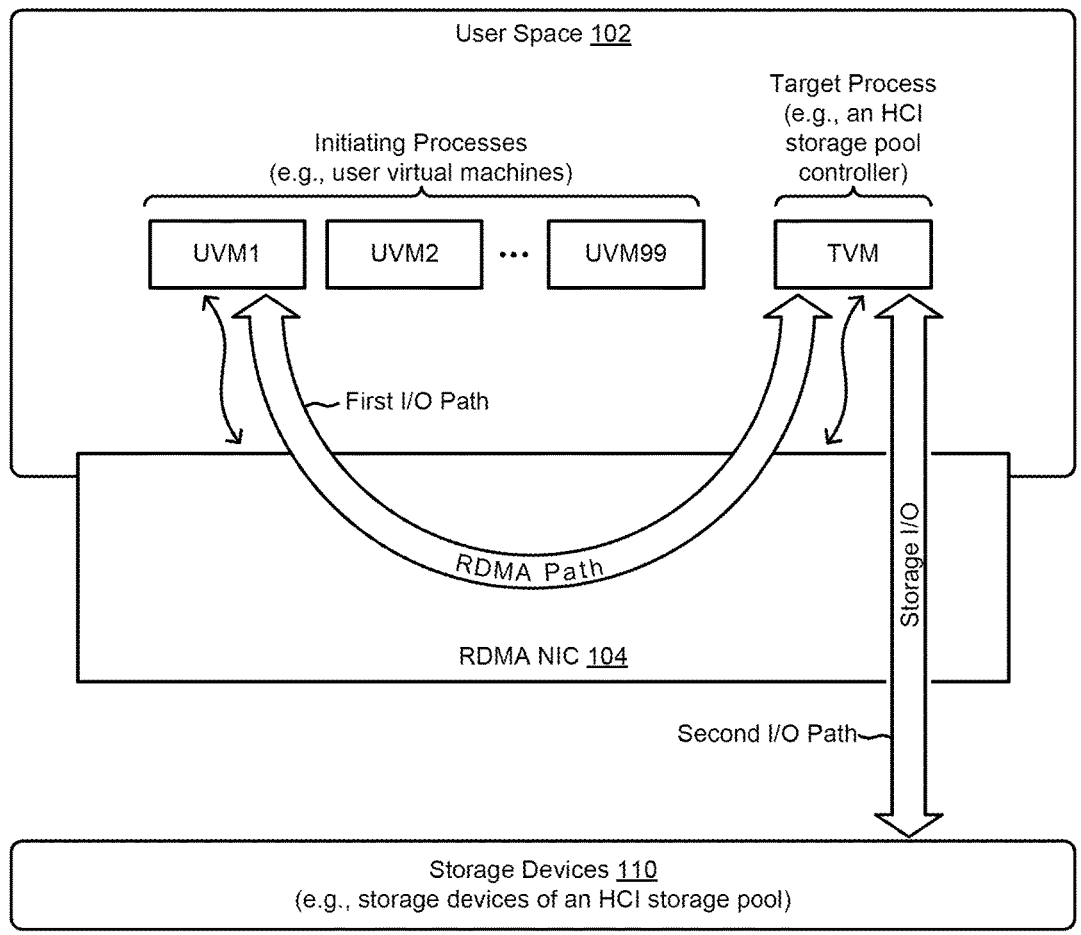
FIG. 1A depicts a computing environment showing virtual machine to virtual machine I/O over an RDMA path, according to an embodiment.

Aspects of the present disclosure solve problems associated with using computer systems to reduce or eliminate overhead-incurring operations in the RDMA path. Some embodiments are directed to approaches for configuring RDMA connections between virtual machines so as to facilitate high-performance memory registration for RDMA I/O operations without requiring user intervention. The accompanying figures and discussions herein present example environments, systems, methods, and computer program products.

Overview

Certain aspects of the present disclosure solve problems associated with using computer systems for providing a fast RDMA path between virtual machines. Some embodiments are directed to approaches for configuring RDMA connections between virtual machines to accomplish movement of I/O data without incurring kernel context switching, without incurring memory copies to/from kernel space, and without requiring user intervention to establish and/or use the RDMA connections.

The systems and methods disclosed herein deals with the mechanism that leverages RDMA communication between the individual virtual machine instances and other user-space processes in the computing cluster. In legacy implementations, the communication path relied on a kernel-resident stack (e.g., iSCSI/TCP stack) to forward the virtual machine data to other user-space processes for I/O processing. This path through the kernel incurs memory copies and context switches, often for each I/O operation. In some cases, the TCP path traverses an internal switch (e.g., a virtual switch). In the disclosed embodiments a first virtual machine acts as an initiator of connections, while another user-space process acts as a target. To accelerate RDMA communication between the individual virtual machine instances and other user-space processes, the mechanisms disclosed hereunder show how to setup an RDMA-accelerated communication path between a virtual machine initiator and a target process. Some embodiments are particular to, and comport with, the iSCSI extensions over RDMA (iSER) protocol for accelerated data communication.

The disclosed embodiments automate one or more communication path configurations and tear-down steps. A sample subset of such steps presented in Table 1:

TABLE 1

Examples of communication path configuration and tear-down steps

| Step/Option | Description |
| --- | --- |
| Configuring virtual functions of an RDMA-enabled NIC | Configure and expose a single host side virtual function (VF) for a user virtual machine (UVM) and a single target Virtual Function for accelerating the IO path for all UVMs running on that host/participating in iSER. Such VFs will be carved from a physical function or port from the same RDMA capable NIC which can optionally be connected to a switch or not connected to a switch. In the latter option, the usage of iSER is restricted to node-local traffic (where both the VFs being from the same NIC can talk to each other via the switch-like capability provided by the NIC firmware) between the host VF and the corresponding target on the same host. |

TABLE 1-continued

Examples of communication path configuration and tear-down steps

| Step/Option | Description |
|---|---|
| Configuring predetermined IP addresses | In some cases, a predetermined IP address will be plumbed/configured on each of these VFs (one on the initiator side and the other on the target side). Such configuration steps may be initiated from the target and can be included as part of the standard cluster startup operations. |
| iSCSI login | As part of the UVM startup, the UVM itself or an ancillary process initiates the iSCSI login which happens over the standard TCP path over a virtual switch for every vDisk. This in turn initiates a handshake mechanism such that both endpoints agree to having an iSER/RDMA configuration enabled using a special RDMA extensions key for each vDisk. The aforementioned internal IP address used by the target is bound to the iSER server/target. The IP address and binding is shared with the iSCSI endpoint. An RDMA connection is then setup using this internal IP address. This handshake process can be implemented in a manner that is completely internal (i.e., not exposed to the user or UVMs). Such an RDMA connection can be done for every vDisk. |
| Connection lifecycle management | RDMA connection terminations are gracefully handled by failing over to a TCP path that traverses through a virtual switch. Attempts to reconnect via RDMA will follow the same handshake negotiation described earlier (in the steps above). For iSER connections over TCP network, a dynamic window-based retry mechanism is observed to avoid aggressive retries. |

When performing any of the foregoing communication path configuration and tear-down steps, no user intervention is needed. More specifically, any/all of the foregoing communication path configuration and tear-down steps can be managed by processes other than a user-defined user virtual machine. Furthermore, and as detailed in Table 2, the communication path configuration and tear-down steps can be performed completely transparently.

TABLE 2

Example transparency features

| Feature | Description |
|---|---|
| Agnostic path implementation | A user virtual machine (UVM) is completely unaware of the fact that an RDMA is being used as a transport mechanism. More specifically, the UVM does not know that its 10 path is using RDMA, or single root I/O virtualization (SRIOV), or any other mechanism. |
| Parsimonious use of virtual functions of an RDMA NIC | A single VF on the host is leveraged for all the UVMs participating in iSER, and a target process has a single VF to receive all UVM traffic. There is no necessity in this model to create multiple VFs for handling UVM traffic (unlike in typical SRIOV configurations, where each UVM running on the same host gets its own VF). This one-to-many mapping allows sharing a single VF for all of the participating UVMs on a particular host. |
| No custom UVM software | The UVMs do not need custom software that implements iSER clients and no updates to its packages, binaries, and/or modified applications are required. |
| Kernel independence | There is no need for any particular capability to be run inside the kernel of the host for providing an RDMA path for UVM data traffic. Initiation is accomplished completely in user space on the host. The target receives I/O data over the RDMA path. |
| Automatic adaptation to a changed iSER IP address | The sharing of the iSER IP address by the target allows for automatic adaptation when an administrator wants to change the internal iSER IP address being used. This can be done without having to perform extensive configuration changes other than a simple ifconfig change to plumb the new iSER IP. Therefore there is no need to modify any UVM to accommodate configuration of the RDMA path. |
| Support for intra-node local and inter-node iSER traffic | I/O path acceleration can happen over ports that are not connected to a switch for node-local traffic or over connected ports across the cluster. This solution is extensible to both node-local and inter-node iSER traffic. |
| Transparent RDMA handshake negotiation | All aspects of the RDMA handshake negotiation, which includes sharing of the iSER IP address, is completely internal and hidden from the users/UVMs and UVM-based applications. |

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A depicts a computing environment 1A00 showing virtual machine to virtual machine I/O (input/output or IO) over an remote direct memory access (RDMA) path. As an option, one or more variations of computing environment 1A00 or any aspect thereof may be implemented in the context of the architecture and functionality of the embodiments described herein and/or in any environment.

FIG. 1A shows several initiating processes (e.g., user virtual machine UVM1, virtual machine UVM2, . . . , virtual machine UVM99), a storage pool controller (e.g., the shown TVM), and an RDMA-enabled NIC (e.g., RDMA NIC 104) to carry out I/O operations between the initiating user virtual machine and the storage pool controller. The first I/O path implements a mechanism for RDMA I/O operations to be carried out between the two shown computing elements while the second I/O path provides a mechanism for storage I/O operations to be carried out between the storage pool controller and storage devices 110.

In this embodiment, both the initiating processes (e.g., UVMs) and the target process (e.g., the TVM) are situated in user space 102. The RDMA is implemented independent of the existence of any particular kernel. The foregoing notwithstanding, a computing environment 1A00 might include one or more kernels.

Some embodiments implement a first I/O method for transmitting from an I/O initiator to a storage pool controller (e.g., using the first mechanism of the first I/O path). For example, the first I/O call from a user virtual machine of a virtualization environment to a hyperconverged computing infrastructure (HCI) storage pool controller may include I/O data that is destined ultimately to be saved in persistent storage in or on the storage devices. As shown, the first I/O call from a user virtual machine of the virtualization environment to the HCI storage pool controller is implemented using RDMA. Before being stored in the storage devices, the I/O data is processed by the storage pool controller. Responsive to the first I/O call (e.g., over the first I/O path) and responsive to processing by the storage controller, the storage controller implements a second method to move data from the storage pool controller to one or more storage devices of the HCI storage pool. The second I/O call (e.g., using the second path) might be through the RDMA NIC (as shown), or the second I/O call might be implemented using a data communication mechanism other than through the RDMA NIC.

In the embodiment depicted, the HCI storage pool controller is a computing module that handles I/O to and from storage devices of a virtualization system, wherein the storage devices (e.g., networked storage, or storage that is directly connected to a processor within a node) of the virtualization system are attached to a plurality of nodes that are combined into a computing cluster.

The term hyperconverged computing infrastructure and/or the acronym HCI refers to embodiments that configure local storage that is within or directly attached to nodes comprising a computing cluster to be managed as part of a storage pool. Such local storage can include any combinations SSDs and/or HDDs and/or hybrid disk drives. The address spaces of a plurality of storage devices, including both local storage (e.g., using node-internal storage devices) and any forms of network-accessible storage, are collected to form a storage pool having a contiguous address space. READ/WRITE access to any portion of the contiguous address space of the storage pool is managed by an HCI storage controller.

More specifically, and as discussed hereunder, the storage space within a node is managed as part of an HCI storage pool. The address spaces of the plurality of storage devices, including both local storage (e.g., using node-internal storage devices) and any forms of network-accessible storage, are collected to form an HCI storage pool having a contiguous address space that is managed by the HCI storage pool controller.

Additionally or alternatively, an HCI storage pool controller can be implemented using any known techniques, such as, for example, an HCI storage pool controller can be implemented in (or as) a virtual machine that resides in the user space of an operating system. In some cases, an HCI storage pool controller can be implemented as a controller virtual machine (CVM) that resides in the user space of an operating system.

In other cases, an HCI storage pool controller can be implemented as any one or more computing modules that reside partly in the user space of an operating system and partly in the kernel space of an operating system. In still other cases, an HCI storage pool controller can be implemented as any one or more computing modules that reside solely in the kernel space of an operating system.

Additionally or alternatively, an HCI storage pool controller can be implemented in hypervisors that are deployed in nodes of a computing cluster, where the HCI storage pool controller is configured to manage accesses to and from an HCI storage pool having a plurality of storage devices that are logically arranged to form an address space that is common to nodes of the computing cluster. The computing cluster and its HCI storage pool can be expanded when an additional node is configured into the computing cluster. The computing cluster itself is configured as a hyperconverged computing infrastructure having a collection of nodes, each of which nodes have a computing capability, a networking capability, and a storage capability such that the addition of such a node serves to add computing capability, networking capability, and additional storage capability (i.e., when configured into the HCI storage pool).

FIG. 1B shows an example system 1B00 that uses a one-to-one mapping of virtual functions of an RDMA NIC to respective initiator virtual machines when implementing a kernel-independent data path between virtual machines. As an option, one or more variations of system 1B00 or any aspect thereof may be implemented in the context of the architecture and functionality of the embodiments described herein and/or in any environment.

In this embodiment, one-to-one mapping 108 serves to correspond individually-addressable virtual functions of an RDMA NIC 104 to respective initiator virtual machines. In the shown example, virtual function VF1 corresponds to its respective UVM1, virtual function VF2 corresponds to its respective UVM2, virtual function VF3 corresponds to its respective UVM3 (not shown), and virtual function VF4 corresponds to its respective UVM99. The embodiment also implements a one-to-one mapping 108 between virtual function VF5 and target virtual machine 106.

In operation, a user virtual machine sends I/O data 111 to target virtual machine 106 through virtual function VF1, which I/O data 111 is received by the target virtual machine via virtual function VF5. The target virtual machine processes the I/O data to determine a specific destination (or destinations) in the storage pool (or other storage pools), and then stores the I/O data 111 to one or more of the storage devices 110 of the storage pool.

This configuration can be used when there are a large number of IP addresses that can be allocated to the RDMA NIC. In some situations however, a system may not have a large number of IP addresses that can be allocated to the RDMA NIC, and/or the management of such a large number of IP addresses becomes an administrative burden. An alternative approach to the foregoing one-to-one mapping is shown and described as pertains to the one-to-many mapping example of FIG. 1C.

FIG. 1C shows an example system 1C00 that uses a one-to-many mapping 112 of a single virtual function of an RDMA NIC to multiple initiator virtual machines when implementing a kernel-independent data path between virtual machines. As an option, one or more variations of system 1C00 or any aspect thereof may be implemented in the context of the architecture and functionality of the embodiments described herein and/or in any environment.

This embodiment facilitates implementation of a method for transmitting from an I/O initiator (e.g., the shown initiating user virtual machines) to a target virtual machine 106 using dedicated virtual functions (e.g., VF1 and VF2) of the RDMA NIC 104. The method is carried out by initiating an I/O request from an I/O initiator (e.g., a user virtual machine) in the user space of a virtualization environment 105 and carried out through the dedicated virtual functions of the RDMA NIC. The virtual function is exposed in user space, whereas other aspects of the RDMA NIC may be exposed in kernel space. More specifically, a first virtual function of the RDMA NIC is used to expose at least one RDMA function to a UVM that is an I/O initiator (e.g., where the UVM is a user virtual machine that initiates SCSI communications). Additionally, a second virtual function is used by target virtual machine 106. When the target virtual machine receives the RDMA I/O from a UVM, the target virtual machine processes the I/O to convert the I/O into a SCSI I/O comprising I/O data 111, and then forwards the SCSI I/O to storage devices 110.

The virtual functions are configured based on operations that had been performed prior to initiating the I/O request by the user virtual machine. More specifically, in some implementations, and as shown, an I/O call raised by a user virtual machine may be processed by any one or more computing elements (e.g., the shown process 'P') before being delivered to the virtual function. Such a process 'P' may be configured to handle multiple threads of communication that may be raised by any individual virtual machine. In some embodiments, process 'P' may include all or portions of a multi-thread I/O path manager such as is discussed infra.

As compared with alternatives to the architecture of FIG. 1B, the single virtual function of the RDMA NIC that is used to expose the RDMA function to the many user virtual machines is not a paravirtualized function of the RDMA (PVRDMA) NIC.

Figure 1D:
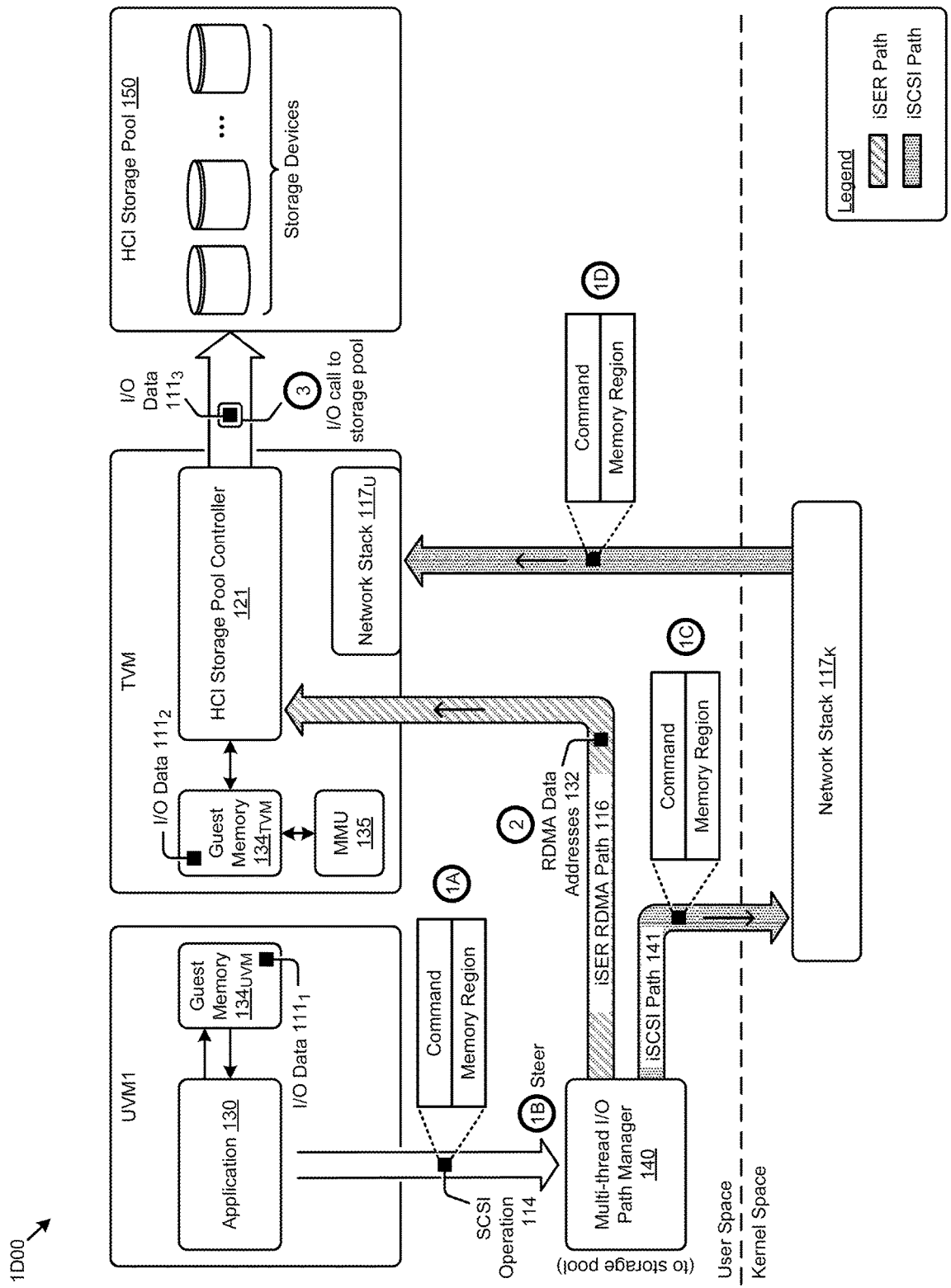
FIG. 1D depicts an example system that implements two independent paths between a user virtual machine and an HCI storage pool controller virtual machine, according to an embodiment.

FIG. 1D depicts an example system 1D00 that implements two independent paths between a user virtual machine and an HCI storage pool controller virtual machine. As an option, one or more variations of system 1D00 or any aspect thereof may be implemented in the context of the architecture and functionality of the embodiments described herein and/or in any environment.

Based on the foregoing communication path configuration and tear-down steps (e.g., as depicted in Table 1) and based on the foregoing transparency features (e.g., as depicted in Table 2), the user virtual machines need not be aware that RDMA is being used for I/O operations. A process other than a user virtual machine can configure a single virtual function (VF) of an RDMA NIC on a host computer. The VF is configured to as to be accessed by any/all the user virtual machines that participate in iSCSI extensions over RDMA (iSER) communications. Furthermore, a storage pool controller (e.g., the shown HCI storage pool controller 121) accesses a second single VF of the RDMA NIC of the host computer to receive certain I/O traffic of the user virtual machine. As such, the user virtual machines do not need custom software to implement iSER clients.

Furthermore, there is no need for modification of a kernel portion of an operating system of a host computer. This is because the RDMA path for data traffic is driven completely in the user space of the host computer. That is, both the user virtual machine UVM1 and the HCI storage pool controller 121 operate in user space, independent of any kernel space function. The virtual functions of the RDMA NIC are exposed in user space.

This architecture brings tremendous flexibility, yet without the need for administrative intervention. Specifically, and as one example, an application 130 can raise a SCSI operation 114 that includes a command and a memory region (see circle 1A) taken from guest memory $134_{UVM}$, and the application can be completely unaware that the SCSI operation is intercepted by a multi-thread I/O path manager 140. The multi-thread I/O path manager then determines the nature of the command, and based on the nature of the command, the multi-thread I/O path manager steers (see circle 1B) a new I/O over one or another path (e.g., over the iSER RDMA path 116 or over the iSCSI path 141). In the latter case, the foregoing SCSI operation is processed as follows (1) the memory region1 is registered with the RDMA NIC (not shown), and (2) the SCSI operation 114 is formatted by the multi-thread I/O path manager 140 into an iSCSI packet (see circle 1C).

In many situations, the memory region of SCSI operation 114 is memory that had not been already pinned and registered with the RDMA NIC and, as such, that memory region would need to be pinned and registered with an RDMA NIC before using the RDMA NIC for I/O. In this embodiment, the iSCSI path 141 is used to facilitate pinning and registration of memory address regions with the particular RDMA NIC. Specifically, when the HCI storage pool controller 121 receives the iSCSI packet (at circle 1D), the HCI storage pool controller (1) pins a memory region of guest memory $134_{TVM}$ (e.g., via memory management unit 135), and (2) registers the TVM memory region with an RDMA NIC (not shown). At this point, the I/O data $111_1$ can be cast (at circle 2) onto iSER RDMA (e.g., shown as RDMA data address 132). The RDMA NIC carries out movement of the I/O data from application 130 to the HCI storage pool controller 121. More specifically, the RDMA NIC carries out movement of I/O data $111_1$ from guest memory $134_{UVM}$ of application 130 of the virtual machine UVM1 to a I/O data $111_2$ of guest memory $134_{TVM}$ of the HCI storage pool controller 121 of the TVM. The HCI storage pool controller is now able to form an I/O call to the storage pool using any method that would be applicable to, and/or as corresponds to, the particular storage device or storage devices of the HCI storage pool 150. More specifically, the I/O call to the storage pool (see circle 3) includes I/O data $111_3$ which data is then stored in the storage devices.

As can be seen from the foregoing illustration, the network stack of the kernel (e.g., the shown network stack $117_K$) and the network stack of the TVM (network stack $117_U$) were used only for configuration—not for I/O data movement. Once the memory regions to be involved in data movement over the RDMA NIC have been pinned and registered with the RDMA NIC, then data can be moved from a first virtual machine in user space to second virtual machine (or other process) in user space without having to incur context switches between user space and kernel space, and without having to incur processing latency inherent in the network stacks. More specifically, once the memory regions to be involved in I/O data movement over the RDMA NIC have been pinned and registered with the RDMA NIC, then I/O data can be moved using an RDMA call that moves I/O data from user space locations of the virtual machine to different user space locations of a different virtual machine.

This architecture brings tremendous flexibility, yet without the need for administrative intervention. Specifically, as one example, an iSER IP address used by an I/O target process can change its internal iSER IP address without any processes or administrative intervention to modify any configuration settings of the user virtual machine. Furthermore this architecture can perform I/O path acceleration over ports that are not connected to a switch. Additionally or alternatively, this architecture can perform I/O path acceleration over ports that are connected to a switch. Some embodiments perform an RDMA handshake negotiation in which at least an iSER IP address can be shared between any target and any initiator(s).

Figure 1E:
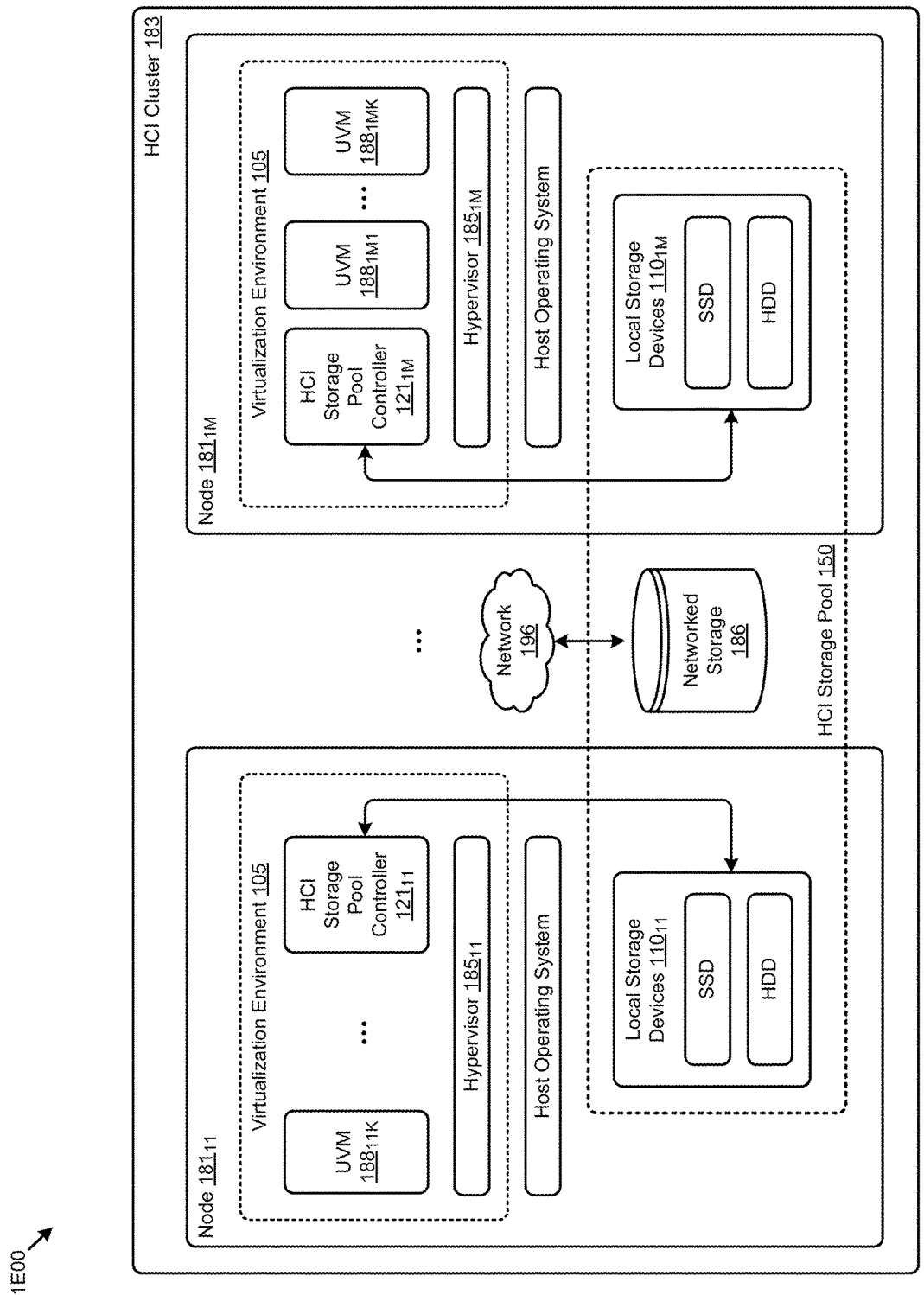
FIG. 1E depicts an example system that implements an HCI storage pool using two nodes in the same computing cluster, according to an embodiment.

FIG. 1E depicts an example system that implements an HCI storage pool using two nodes in the same computing cluster. As an option, one or more variations of system 1E00 or any aspect thereof may be implemented in the context of the architecture and functionality of the embodiments described herein and/or in any environment.

Each of the nodes of the cluster (e.g., node $181_{11}$, ..., node $181_{1M}$) each have their corresponding hypervisors (e.g., hypervisor $185_{11}$, ..., hypervisor $185_{1M}$) over which any number of user virtual machines (e.g., UVM $188_{11K}$, UVM $188_{1M1}$, ..., UVM $188_{1MK}$) can be situated. Further, each of the nodes of the cluster have respective hypervisors over which node-specific HCI storage pool controllers (e.g., HCI storage pool controller $121_{11}$, ..., HCI storage pool controller $121_{1M}$) can be situated. As such, each node-specific HCI storage pool controller can directly attach to its respective node-specific storage (e.g., local storage devices $110_n$, ..., local storage devices $110_{1M}$). The nodes combine over network 196 to form an HCI cluster (e.g., HCI cluster 183). The local storage devices (e.g., local storage devices $110_{11}$, ..., local storage devices $110_{1M}$) and any networked storage 186 are organized into a single contiguous address space across the HCI cluster. The HCI storage pool controller manages traffic from any source (e.g., a node) to any destination (e.g., any SSD or HDD storage device) based on a destination address or address range that lies within the single contiguous address space.

As used herein, an HCI cluster is a collection of independent nodes that each consist of CPU, memory, and direct attached storage. There is also a controller VM, which has the HCI software running in it. It is a distributed system, which means all nodes are aware of their presence in the cluster, and using it, it is possible to provide a unified namespace i.e., a distributed storage fabric). Using this, it is possible to provide all the necessary services including VM storage, file storage, block storage, disaster recovery, data protection, and many more.

Pillars of Design

Firstly, fine-grained metadata makes the system adaptive, scalable and makes healing faster. Secondly, the system maintains locality of data, and one copy of data is always local, which benefits performance and removes dependence on the network. This also allows flexible movement of data with location awareness. Thirdly, every byte of data written can be also written across nodes in accordance with a desired replication factor.

Adding a node to the system and making use of it can be done without needing any downtime. Work is equally divided across all nodes of the cluster, thus allowing true scalability by mere addition of new nodes.

Figure 2:
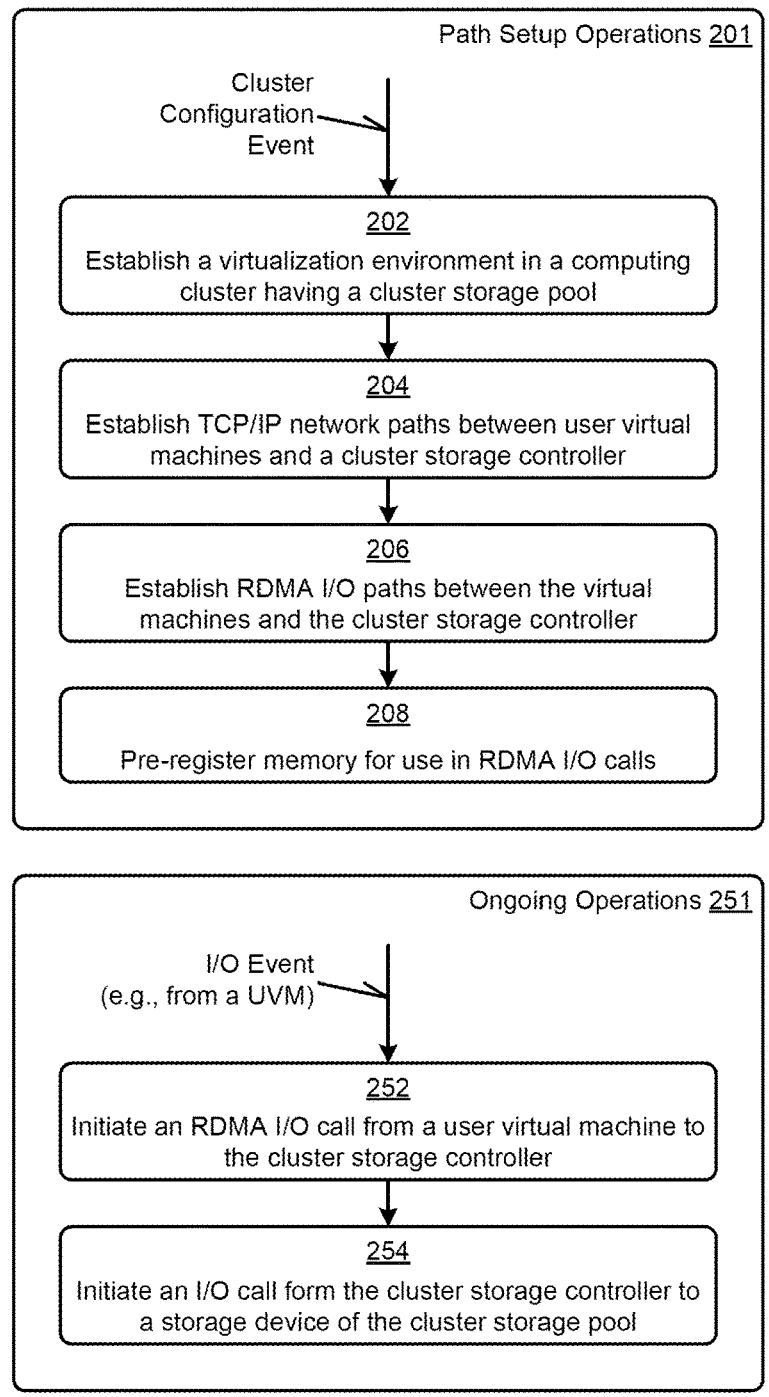
FIG. 2 is a flowchart depicting setup and ongoing operations of a system for reducing or eliminating overhead-incurring operations in an RDMA path, according to an embodiment.

FIG. 2 is a flowchart depicting setup and ongoing operations of a system for reducing or eliminating overhead-incurring operations in an RDMA path. As an option, one or more variations of a system 200 or any aspect thereof may be implemented in the context of the architecture and functionality of the embodiments described herein and/or in any environment.

The figure is being presented to illustrate how a virtualization system can be set up in order to facilitate high-performance transfers of data from a virtual machine to a storage controller over an RDMA NIC. The flow of the setup operations 201 illustrate how a virtualization system can be set up for high-performance RDMA data transfers in a manner that does not require user configuration.

As shown, the path setup operations 201 commence at step 202, which is entered upon a cluster configuration event. The cluster configuration event can be raised from an initial deployment or a cluster, or the cluster configuration event can be raised from any change (e.g., adding or enabling an RDMA NIC) that would influence how to establish and maintain RDMA data paths between virtual machines of the virtualization system and an HCI storage controller.

This embodiment includes establishment of a virtualization system (step 202) that uses a storage pool of the subject cluster to satisfy at least some of the storage needs of virtualized entities (e.g., virtual machines, containers, etc.). As heretofore described, a cluster storage pool can be implemented using a plurality of computing nodes that form the cluster, where each node has a respective hypervisor over which a node-specific HCI storage pool controller operates.

To accommodate traffic between a virtualized entity and a storage pool controller, and/or to accommodate traffic between a first storage pool controller at a first node and a second storage pool controller at a second node, TCP paths (step 204) and RDMA paths (step 206) are configured. In this and other embodiments, the TCP paths accommodate various sorts of network traffic over the TCP paths including, but not limited to, iSCSI traffic and iSER traffic.

The path setup operations 201 further comprise a step 208 that serves to pre-register memory that is used in subsequent RDMA I/O calls. The particular mechanism or mechanisms employed for registering memory that is used in subsequent RDMA I/O calls may depend on the cluster configuration (e.g., node and network infrastructure configurations) and/or node-by-node I/O device configurations (e.g., which RDMA NICs are available for use) and/or other characteristics of the virtualization system environment. Various different memory registration mechanisms are described infra.

The shown ongoing operations 251 are presented to illustrate a two-step procedure where, in a first step (e.g., as depicted by step 252), a virtual machine (e.g., a user virtual machine) communicates I/O data over RDMA to a cluster storage controller and where, in a second step (e.g., as depicted by step 254), the cluster storage controller communicates to a storage device of the cluster storage pool (e.g., to persist the aforementioned I/O data onto a storage device).

Performance of the ongoing operations 251 depends, at least in part, on the establishment of RDMA paths between virtual machines and the cluster storage controller of a particular node (step 206). More specifically, performance of the ongoing operations 251 depends, at least in part, on the establishment of RDMA paths for the virtual disks of the virtual machines. There are many options for the establishment of RDMA paths for the virtual disks of virtual machines, some of which options are shown and described as pertains to FIG. 3A and FIG. 3B.

Figure 3A:
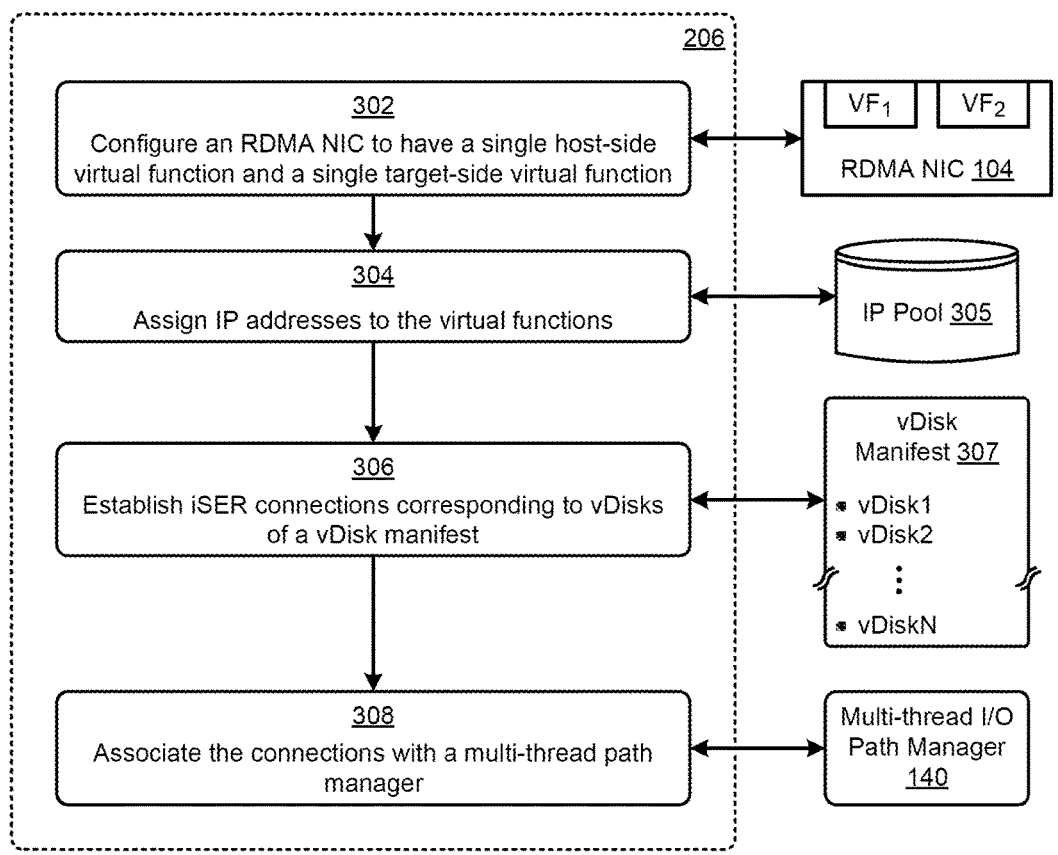
FIG. 3A is a flowchart depicting an example setup scenario for establishing an RDMA between a virtual machine and a cluster storage controller, according to an embodiment.

FIG. 3A is a flowchart depicting an example setup scenario 3A00 for establishing an RDMA between a virtual machine and a cluster storage controller. As an option, one or more variations of setup scenario 3A00 or any aspect thereof may be implemented in the context of the architecture and functionality of the embodiments described herein and/or in any environment. More particularly, setup scenario 3A00 includes establishment of paths between virtual machines and a cluster storage controller (referring again to step 206 of FIG. 2)

One result from performance of steps shown in FIG. 3A is the establishment of high-performance RDMA paths between virtual disks and a cluster storage controller. In this particular embodiment, high-performance RDMA paths between virtual disks and a cluster storage controller include iSER paths. Establishment of high-performance RDMA paths can be accomplished by carrying out the steps of (1) configuring an RDMA NIC 104 to have a host-side virtual function VF1 exposed in user space as well as configuring the same or different RDMA NIC to have a target-side virtual function VF2 exposed in user space (step 302), (2) accessing a pool of available IP addresses (e.g., IP pool 305) for assigning IP addresses to the virtual functions (step 304), and (3) establishing iSER connections corresponding to a plurality of vDisks (e.g., vDisks identified in a vDisk manifest 307) of a virtual machine (step 306).

The foregoing iSER connections corresponding to vDisks can be established over a variety of pre-existing network connections. Moreover, each vDisk may be associated (step 308) with its own I/O threads, which I/O threads may be managed, at least in part, by a multi-thread I/O path manager 140. Implementation and use of such a multi-thread I/O path manager is now briefly discussed.

Connection Management Implementation and Multi-Thread I/O Path Manager Overview

Referring to the shown multi-thread I/O path manager 140, the functions of such a multi-thread I/O path manager can be implemented in a hypervisor. Additionally or alternatively, the functions of such a multi-thread I/O path manager can be implemented in whole or in part by processes other than a hypervisor. A multi-thread I/O path manager can communicate with any one or more HCI storage pool controllers, possibly using the iSCSI protocol. The functions of such a multi-thread I/O path manager include forwarding I/Os originating from the UVMs (e.g., SCSI I/Os) to an HCI storage pool controller, which in turn services the originally-raised I/O request. Once the originally-raised I/O request is complete, the HCI storage pool controller returns the response corresponding to the IO request, together with any data involved in the request (e.g., in the case of SCSI read requests). In this model, the multi-thread I/O path manager is always the iSCSI initiator of data I/O requests while the HCI storage pool controller plays the role of the iSCSI target.

In certain implementations, there is one multi-thread I/O path manager instance per each UVM and there are two threads for each vDisk of the UVM. Each thread creates an iSCSI connection to connect each of the UVM's vDisks with an HCI storage pool controller. For example, if a UVM has four vDisks, then the multi-thread I/O path manager will have four iSCSI connections with the HCI storage pool controller on that node. Since there are two threads for each vDisk of the UVM so, then overall, this example there will be eight iSCSI connections that are used for HCI storage pool controller I/O.

Referring again to step 306 of FIG. 3A, some means needs to be provided to establish iSER connections. One possible technique for establish iSER connections for vDisks is shown and described as pertains to the protocol of FIG. 3B.

Figure 3B:
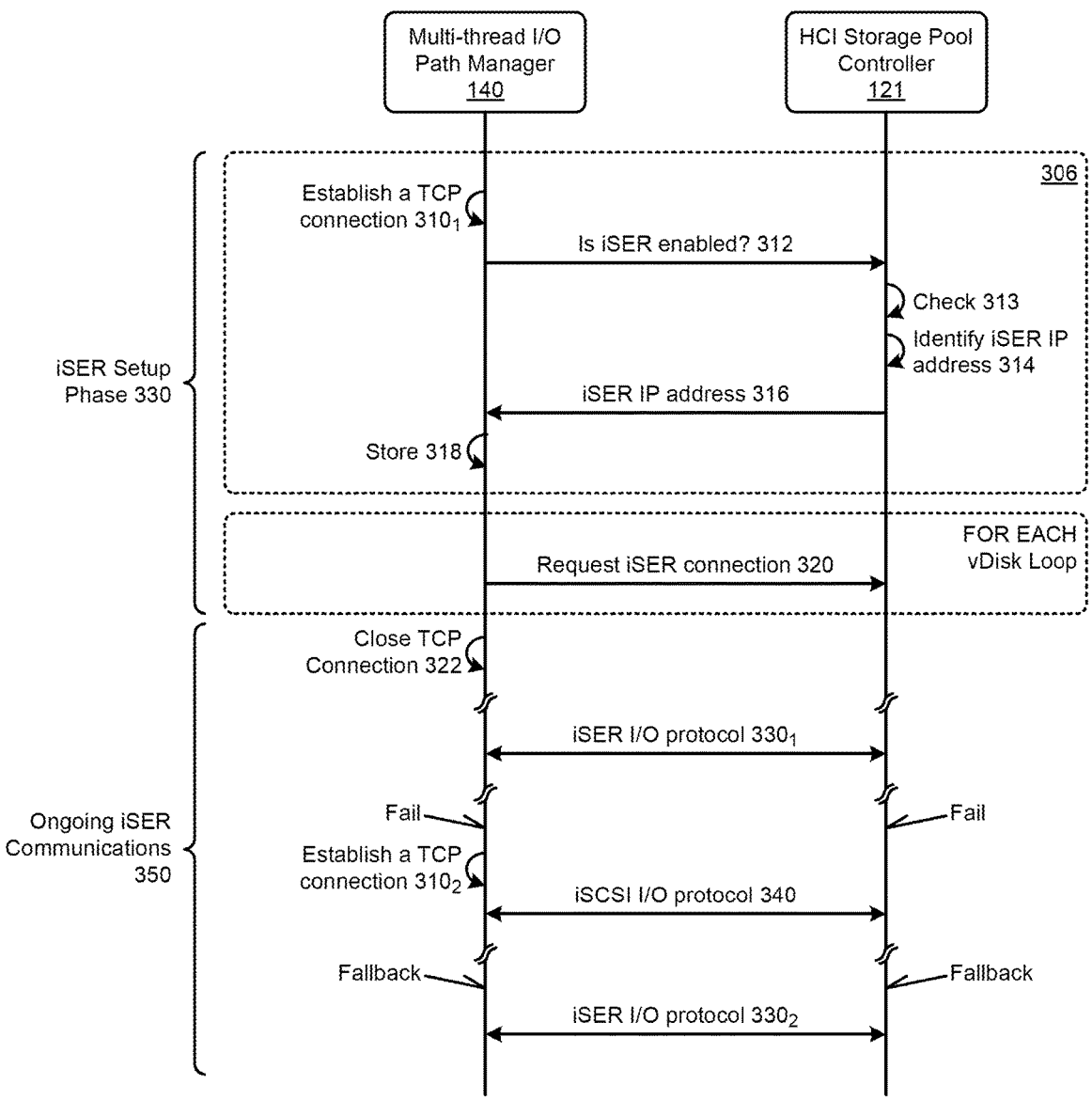
FIG. 3B depicts a protocol for an iSER setup, according to an embodiment.

FIG. 3B depicts a protocol 3B00 for an iSER setup. As an option, one or more variations of protocol 3B00 or any aspect thereof may be implemented in the context of the architecture and functionality of the embodiments described herein and/or in any environment.

iSER Connection Setup

A protocol between multi-thread I/O path manager 140 and HCI storage pool controller 121 is carried out to establish iSER connections. In further illustration of step 306 if FIG. 3A, during and as a part of the iSCSI login process for each vDisk (i.e., iSER setup phase 330 of FIG. 3A), first a TCP connection is established (operation $310_1$). Next, the multi-thread I/O path manager sends an iSER inquiry (message 312) to the HCI storage pool controller to inquire if iSER is enabled (check 313). If so, the HCI storage pool controller identifies a corresponding iSER IP address (operation 314) and sends that iSER IP address to the inquiring multi-thread I/O path manager (message 316), at which time the inquiring multi-thread I/O path manager stores the iSER IP address (operation 318). Referring again to the iSER inquiry (message 312), if iSER is enabled on the target end (e.g., enabled at the HCI storage pool controller), then the multi-thread I/O path manager queries the HCI storage pool controller through the TCP connection established in operation $310_1$ to ask if the HCI storage pool controller has RDMA enabled. If RDMA is enabled for iSER, the HCI storage pool controller responds to this inquiry by returning the target's iSER IP address. The multi-thread I/O path manager uses this iSER IP address in a 'connect' request.

The multi-thread I/O path manager uses this returned iSER IP address and issues a connect request (message 320). In some cases, such as when there are multiple vDisks in the manifest, a FOR EACH loop iterates for each vDisk showing in the manifest so as to open an iSER connection for each vDisk. Once the iSER connections have been successfully established between the multi-thread I/O path manager and the HCI storage pool controller, the primary TCP connection that was used when initiating this portion of the protocol is then closed (operation 322).

The protocol then moves from the iSER setup phase 330 to begin carrying out ongoing iSER communications 350. During such ongoing iSER communications, all UVM SCSI traffic is forwarded to a corresponding HCI storage pool controller via the iSER connection(s).

In some implementations, and specifically referring to the underlying RDMA transport mechanisms, the rdma_cm verbs library are used. Use of these verbs facilitates communicating with an IP address that had been previously set up on RDMA interfaces. This implementation choice also helps to seamlessly run applications on top of any type of RDMA card (e.g., INFINIBAND™, RoCE, iWARP etc.).

Both endpoints engage in the negotiation to enable iSER and to setup connections between the endpoints. More specifically, the multi-thread I/O path manager, which serves as an iSCSI/iSER initiator, performs the RDMA client-side setup and ongoing actions, whereas the HCI storage pool controller, which serves as an iSCSI/iSER target, performs the RDMA server-side actions.

Once the endpoints have engaged in their negotiation, and once the iSER connections have been established, the iSER I/O protocols/communications are carried out (messages $330_1$). Such iSER protocols/communications can continue indefinitely. However, there may be situations where the is a failure that prevents further iSER I/O protocols/communications to continue. In such a case, the herein-disclosed embodiment fails over gracefully by continuing I/O operations using TCP communications rather than iSER communications.

Failover to TCP

Following are possible failure scenarios in which RDMA connections could get terminated:

Device removal/failure events;
Peer endpoint restarts;
I/O failures (due to programming errors).

In such possible failure scenarios, a failover mechanism is initiated by the multi-thread I/O path manager, which will establish or reestablish TCP connections $310_2$ (e.g., one newly-established or newly re-established TCP connection for each of the failed iSER connections). Correspondingly, the HCI storage pool controller will accept TCP connection requests from the multi-thread I/O path manager. Thereafter, data forwarding from the multi-thread I/O path manager will be resumed on this TCP path based on the iSCSI I/O protocol 340. Such a failover regime that gracefully fails into TCP I/O (i.e., I/O that is not performed over iSER or RDMA connections) can continue indefinitely; however, in the timing of and in accordance with remediation of the foregoing possible failure scenarios, it is possible to fallback into iSER.

Fallback to iSER

To reinitiate ISER connections, either of HCI storage pool controller or the multi-thread I/O path manager can initiate the transition back to iSER. If the HCI storage pool controller initiates the transition, then the HCI storage pool controller can send an out-of-band message to the multi-thread I/O path manager to invoke the multi-thread I/O path manager's iSER connect mechanism. Alternatively, the multi-thread I/O path manager can initiate a fallback in a manner corresponding to the operations and messages shown as the iSER setup phase 330.

Periodic retries can be attempted as long as both endpoints are able to negotiate between themselves, and so long as iSER is still enabled. If the state of iSER enablement changes at either endpoint after the login process for a given vDisk, then an out-of-band message can be initiated to avoid further retries. This avoids overly aggressively issuing reconnects.

In some situations, such as when iSER is operating over connected ports to remote HCI storage pool controllers, to avoid bombarding each endpoint with a continuous stream of iSER reconnect requests, then, in the event of network/cabling issues, a time period windowing model can be followed by the initiating endpoint. For example, a reconnect mechanism for iSER might observe a sliding window interval, say 15 minutes. Additionally or alternatively, limits can be instituted. For example, a limit might be established such that "at most 'x' retries are to be made within a given window". Failure to setup a successful iSER connection within these 'x' attempts will delay further retries to the next time-wise sliding window. Successful establishment of an iSER connection within a given window will reset the retry window.

When the fallback communications between the multi-thread I/O path manager 140 and the HCI storage pool controller 121 have completed, then the iSER I/O protocol $330_2$ can begin again.

Figure 4A:
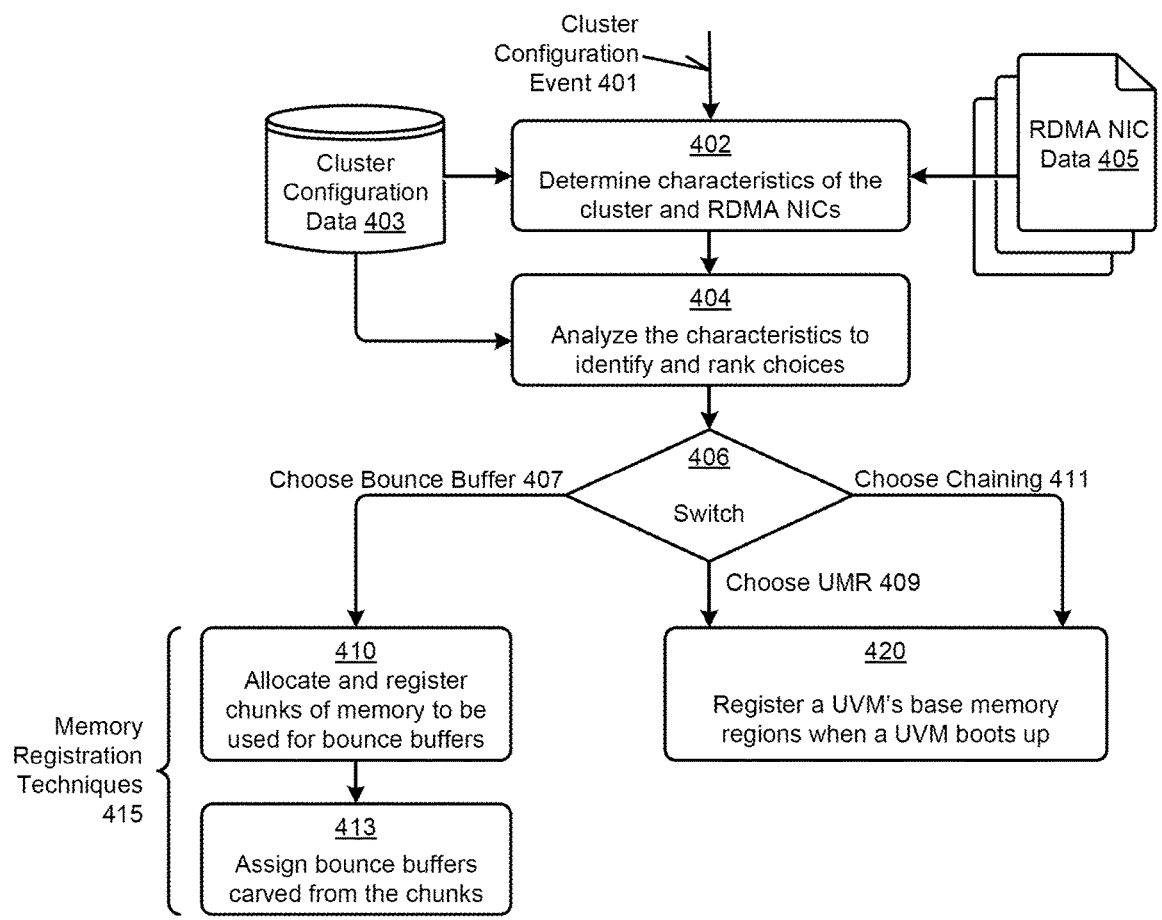

FIG. 4A presents several alternative memory registration techniques as used in systems that exhibit reduced or eliminated RDMA overhead. As an option, one or more variations of alternative memory registration techniques 4A00 or any aspect thereof may be implemented in the context of the architecture and functionality of the embodiments described herein and/or in any environment.

The figure is being presented to show how one or more of several alternatives for memory registration can be selected and initiated. A dominant contributing aspect that facilitates reduced or eliminated RDMA overhead is the preregistration of memory for RDMA transfers using a path other than the RDMA path. As is well understood by those of skill in the art, one prerequisite for performing a data transfer over RDMA is that the underlying memory portions (e.g., buffers) participating in the direct memory-to-memory access operation must be registered with the underlying RDMA NIC or NICs. In accordance with the RDMA protocol, such registration generates local keys and remote keys, which must be supplied when making an RDMA operation request. As previously discussed, memory registrations are costly operations and it is desirable to perform such registrations in a manner that avoids incurring overhead in the RDMA path. The cost of registering typically incurs somewhere between 30 microseconds to few hundred microseconds for sizes ranging from 4 KB to about 40 MB; hence, one approach to achieving high-performance RDMA transfers is to ensure that memory is registered using networking facilities that are outside of the RDMA path. More specifically, many of the herein-disclosed approaches to achieving high-performance RDMA transfers is to ensure that memory is registered using networking non-RDMA facilities (e.g., TCP protocols, iSCSI protocols, etc.).

FIG. 4A discloses a mechanism for selecting between alternative memory registration techniques using memory that can be registered out of band from the RDMA path (e.g., using non-RDMA facilities).

There are three alternatives shown, however the shown alternatives are selected merely as illustrations of how one or more alternative memory registration techniques can be implemented in the same system and, in some cases, at the same time. The three alternatives are shown as choices that are made in switch 406. Specifically, one choice (e.g., choice 407) is to use a pre-registered bounce buffer, a second choice is to use user mode registration (choice 409), and a third choice is to use a chaining (choice 411).

The decision-making of switch 406 relies, at least in part, on a collection of characteristics of the cluster and/or characteristics of any RDMA NICs that are involved in the RDMA paths. Such a collection of characteristics can be gathered at any moment in time however, and as shown, a suitable time for gathering the aforementioned cluster and RDMA NIC characteristics is whenever there is a cluster configuration change that raises a detectable event (e.g., cluster configuration event 401). At that time, processing within or as directed by step 402 analyzes cluster configuration data 403 and RDMA NIC data 405 so as to determine sufficient characteristics of the cluster and/or characteristics of any RDMA NICs such that one or more of the choices of switch 406 can be evaluated (e.g., in step 404). Strictly as one illustrative scenario, a cluster configuration event in the form of an addition of a node to the cluster might be met with a determination that the newly-added node has an RDMA-enabled NIC that supports user mode registration (UMR) and, as such, the option to choose UMR might be a good one. Alternatively, and again strictly for illustration, a cluster configuration event in the form of a new service level agreement (SLA) term requiring a replication factor=3 to be implemented. As such, a cluster configuration event might be met with a determination (e.g., in step 404) that the option to pursue the bounce buffer choice might be no longer feasible in the then-current cluster configuration. Of course the foregoing are merely examples for illustration and there are many more scenarios that, once analyzed (e.g., by step 404) would inform the operation of switch 406 to enable one or more of the shown choices.

As shown, irrespective of the choice or choices that are enabled by switch 406, one or more memory registration techniques 415 are employed to register memory that can thereafter be used in an RDMA I/O transfer. In the case when switch 406 takes the path corresponding to "Choose bounce buffer", then step 410 is entered. Memory chunks are allocated using any known memory allocation techniques, and those memory chunks are registered in a manner that facilitates later use of the registered memory in RDMA I/O operations. In some embodiments, and as shown, step 413 is entered so as to assign bounce buffers carved from the preregistered chunks. In other embodiments, the entire preregistered chunk is used as a bounce buffer.

Further details regarding general approaches to managing buffers carved from the preregistered chunks are described in U.S. Pat. No. 10,824,369 titled "ELASTIC METHOD OF REMOTE DIRECT MEMORY ACCESS MEMORY ADVERTISEMENT" issued on Nov. 3, 2020, which is hereby incorporated by reference in its entirety.

Additionally or alternatively, in the case when switch 406 takes the path(s) corresponding to "Choose UMR" or "Choose Chaining", then step 420 is entered. The foregoing cluster configuration change that raises a detectable event (e.g., cluster configuration event 401) might be a "large" event such as adding or removing a hardware component, or might be a "small" event such as adding software to a node of the cluster or starting (e.g., booting) a virtual machine on a node of the cluster. As such, analysis of the nature of the cluster configuration event in combination with analysis of the cluster configuration data might include a determination that a virtual machine has been started (e.g., booted) on a node of the cluster. In such a case, when step 420 is entered, the step might be informed with the identification of booting-up or booted-up user virtual machine. Accordingly, step 420 can determine the real memory location of the booting-up user virtual machine. The base memory region of the UVM or portions thereof can be pre-registered in advance of that VM's initiation of any RDMA I/O. It can be seen than the foregoing pre-registration can be accomplished without using the RDMA path. Thus, in the event that the cluster is a busy cluster that is performing a high volume of data replication over RDMA (e.g., in a high-availability computing setting), any one or more of the memory registration techniques 415 can be accomplished without impacting the high volume of data replication over RDMA at all.

The foregoing option paths that are taken after evaluation pertaining to switch 406 are now briefly discussed.

Bounce Buffer Model

This approach copies the payload portion of an I/O request into pre-registered RDMA memory buffer. This ensures that the data portion always resides in entirety on a single, virtually contiguous buffer. The memory managed for this approach can comport with any one or more of the embodiments given in Table 3.

TABLE 3

| Embodiment | Description |
| --- | --- |
| 1 | Use a pool based memory management allocator to serve RDMA buffers. Each pool manages a set of chunks of virtually contiguous unit of memory, which is sized larger than the largest payload size supported. |
| 2 | Register a chunk as single unit of RDMA registration. |
| 3 | Each chunk can in-turn manage a set of buffers carved from it. A given chunk can be dedicated to serve specific buffer size. |
| 4 | Manage multiple free lists:<br>A) A list of free chunks, each of which can be eventually picked to serve a specific buffer size. This list is managed at the pool level.<br>B) A list of free buffers, each of which has been carved from a chunk. This free list is maintained for every chunk. |

TABLE 3-continued

| Embodiment | Description |
|---|---|
| 5 | Allocation: When an allocation request arrives as a result of a SCSI request, a free chunk is picked and allotted for that object size. A buffer is carved from this chunk and returned to the caller. |
| 6 | Release: When a buffer becomes free (e.g., as a result of IO completion), it is inserted into the free buffer list maintained by the chunk. This buffer can be reused for further IOs. |
| 7 | Chunk Reuse: When a last buffer is freed from a chunk, (e.g., as a result of a completed SCSI request), the entire chunk is considered free and moved to the free chunk list. This allows the chunk to be reused (e.g., for a different buffer size). |
| 8 | Many different buffer sizes are supported. Buffer sizes span from 'small' (e.g., 4 KB) to 'large' (e.g., 2 MB), to 'huge' (e.g., >2 MB). |

The bounce buffer model can be extended to comport with (1) dynamic allocation of RDMA memory, and/or (2) static allocation of RDMA memory. For dynamic allocation of RDMA memory, individual threads can allocate and maintain the chunks as per Table 3. Any chunk that has been idle for a given time threshold (say 60 seconds or so) can be automatically released back to the system. For static allocation of RDMA memory, the overall memory needed for RDMA is reserved upfront. The memory allocated is in the unit of chunks as described in Table 3. The free chunk list is maintained globally throughout the scope of the virtualization system. When a given iSER thread raises an allocation request, a free chunk is selected and assigned to the thread, which then continues to use the chunk without the need to re-register the chunk. Once a chunk is fully free (i.e., there are no buffers of the chunk that are in use), it is released back to the global free chunk list either immediately or after an idle threshold. This technique avoids lock acquisition when accessing the global list. Once the chunk is inserted into the global free chunk list, it can be reassigned to any thread. Alternatively assignments between a thread and a chunk can be statically assigned (e.g., by dividing up all of the chunks equally across the threads).

User-Mode Registration (UMR) Model

Certain RDMA NICs (e.g., certain Mellanox cards) support a second level/indirect registration verbs to generate a single memory registration for all the participating scattered buffers of a DMA operation. One of the verbs of this model generates a single key for an entire list of scattered buffers so as to allow an endpoint to issue a single work request that in turn performs registration of the entire set of scattered buffers. This feature uses a send queue to compose and fill a UMR key from multiple virtually non-contiguous buffers. However this still requires that the memory participating in UMR is already pre-registered the traditional way (i.e., using ibv_reg_mr API, which maps the virtual address to pinned physical pages, and registers the same with RDMA NIC to generate local and remote access keys).

Both the bounce buffer model and the UMR model ensure that the HCI storage pool controller can post a single work request for performing DMA. This is because the HCI storage pool controller can present a virtually contiguous I/O space for any given I/O. Both the bounce buffer model and the UMR model can be employed together in the same cluster. Still further, in addition to concurrent deployment of the bounce buffer model and the UMR model, a yet another model can be deployed, specifically a chaining model, which is discussed hereunder.

Chaining Model

This model allows an HCI storage pool controller to be able to directly perform DMA to the participating buffers using the primary registration of the UVM address space. This is done by sharing the details of each of the participating buffers of the UVM, which, in some embodiments are mapped into the multi-thread I/O path manager's process address space. The details can be shared by including the key of the primary registration in the iSER header. The HCI storage pool controller, upon receipt of an iSER header will (1) compose a chained work request, where each work request describes the corresponding target UVM buffer fragment, and then (2) issue a single verb call such that all the work requests are submitted together and (3) once all the work requests are complete in their entirety, the SCSI command response is sent out. The HCI storage pool controller performs the scattered DMA without involvement of the initiator, and without having to present a virtually contiguous I/O space for the DMA.

Examples of HCI storage pool controller operations that support the foregoing three models are shown and described as pertains to FIG. 4B1, FIG. 4B2, and FIG. 4B3.

FIG. 4B1 illustrates a first usage model 4B100 for use in systems that exhibit reduced or eliminated RDMA overhead. The shown usage model can be used in combination with various memory registration techniques that reduce or eliminate RDMA overhead. Any aspect of the shown usage model 4B100 may be implemented in the context of the architecture and functionality of the embodiments described herein and/or in any environment.

Operation of the shown usage model 4B100 relies, at least in part on pre-registration of memory chunks. Such pre-registration of memory chunks might be carried out in accordance with the allocation/registration techniques and buffer assignment techniques as heretofore described as pertains to FIG. 4A. More specifically, such pre-registration of memory chunks might be carried out in accordance with step 410 and step 413 of FIG. 4A.

Given some prior-time performance of step 410 and step 413 of FIG. 4A, then upon an I/O event (e.g., I/O event 441, as shown in FIG. 4B1) an I/O processing module can process the I/O using an underlying RDMA NIC. More specifically, and as shown, an HCI storage controller can (1) receive an iSER header (step 442), (2) form a list of prospective target buffers to be used for an RDMA I/O (step 444), (3) populate the iSER header with keys that correspond to the target buffers (step 446), and (4) carry-out the RDMA I/O (step 448).

Further details regarding general approaches to handling buffers are described in U.S. application Ser. No. 17/139,698 titled "LOCKLESS HANDLING OF BUFFERS FOR REMOTE DIRECT MEMORY ACCESS (RDMA) I/O OPERATIONS" filed on Dec. 31, 2020, which is hereby incorporated by reference in its entirety.

While the foregoing technique does not incur memory registration overhead in the RDMA path, and while the foregoing technique avoids user space to kernel space context switching, it does incur one or more copy operations from the iSER payload to registered memory. In some cluster configurations, the foregoing one or more copy operations can be avoided through use of user mode registration such as is shown and described in FIG. 4B2 and/or through use of chaining such as is shown and described in FIG. 4B3.

FIG. 4B2 illustrates a second usage model 4B200 for use in systems that exhibit reduced or eliminated RDMA overhead. The shown usage model can be used in combination with various memory registration techniques that reduce or eliminate RDMA overhead. Any aspect of the shown usage model 4B200 may be implemented in the context of the architecture and functionality of the embodiments described herein and/or in any environment.

Operation of usage model 4B200 relies, at least in part on at least in part on pre-registration of memory chunks such as is heretofore described as pertains to choice 409 and step 420 of FIG. 4A. More specifically, a UVM's address space is registered at the time when the UVM starts up. This registration can be accomplished using any known techniques such as (for example) by using the vHost SET_MEM_TABLE call) and/or (for example) using the registration API 'ibv_reg_mr'. In this embodiment a second level memory registration operations are carried out, however, since such a second level memory registration can still amount to costly operations, performing this second level registration is to be done using methods that do not incur the costs in the RDMA path. In the shown embodiment, a multi-thread I/O path manager 140 performs the second level memory registration, however, such a second level memory registration can be carried out by any computing element.

Now, referring to the technique of FIG. 4B200, at any time prior to performance of step 422, an uninitialized cache of UMR keys is created and stored, for example, in a scattered buffer list with corresponding primary registrations and key storage. The number of UMR keys to be stored up to the maximum number of outstanding I/O allowed in the multi-thread I/O path manager. Any uninitialized UMR key can be initialized by sending a work request for UMR_FILL operation in the send queue.

When I/O event 441 is received (e.g., corresponding to an I/O for a given vDisk), a second level registration is performed to register scattered entries. More specifically, and depending on the features of an underlying RDMA card, this can be done using the heretofore-described UMR features to register all of the scattered entries (step 422). Once all of the scattered entries are associated with a UMR key, scattered entries are populated into the iSER header (step 424) together in a batch with UMR keys for each scattered entry. The resulting iSER packet $403_2$ is then sent to the HCI storage pool controller 121. Since the iSER packet $403_2$ has all information (e.g., destination information, I/O payload, buffer addresses in pre-registered memory, and UMR keys) the HCI storage pool controller 121 can complete the requested I/O operation.

Second Level Registration

In some embodiments, and as depicted in FIG. 4B2, a UMR key, along with the start address of the I/O can be encapsulated in the stag and Base Offset fields of the iSER header. Once HCI storage pool controller receives this iSER header, it parses the iSER Header and issues a single work request to the starting address using the UMR key provided.

After the I/O is complete, the corresponding UMR key is invalidated by sending a work request for UMR_INVALIDATE operation. Upon receiving the completion of UMR_INVALIDATE operation, the corresponding UMR key is marked as free and can be reused later for another I/O. This approach eliminates the memory copies of the payload/data portion. This is because, so long as the memory region corresponding to the initiating UVM has been registered (e.g., referring again to step 420 of FIG. 4A1) buffers taken from that memory can be used as source/target addresses in RDMA I/Os.

FIG. 4B3 illustrates a third usage model 4B300 for use in systems that exhibit reduced or eliminated RDMA overhead. The shown usage model can be used in combination with various memory registration techniques that reduce or eliminate RDMA overhead. Any aspect of the shown usage model 4B300 may be implemented in the context of the architecture and functionality of the embodiments described herein and/or in any environment.

iSER Extensions

This approach calls for the UVM address space to be registered at the time of UVM startup (e.g., through the vHost SET_MEM_TABLE call). Registration of the UVM address space ensures that no additional copy of the payload portion of an I/O is needed to accomplish an RDMA I/O. To support this approach, extensions to the iSER protocol are implemented. Such extensions rely, at least in part on population and interpretation of iSER header values that comport with a format where multiple repeated occurrences of the "Stag", "Base Offset" and "size" fields each describe a UVM buffer that is participating in the I/O (e.g., a WRITE I/O or a READ I/O).

Using the foregoing iSER header extension, a UVM can specify multiple buffers in the multiple repeated occurrences of the "Stag", "Base Offset" and "size" fields. Since the UVM memory is pre-registered, then, upon occurrence of an I/O event 441, a look up of the memory registration is carried out (step 432), and thereafter, each of the multiple repeated occurrences of the "Stag", "Base Offset" and "size" fields of the extended version of the iSER header are populated with addresses and keys (step 434). The order of the buffer addresses specified in the header describes the sequence with which the payload is to be constructed.

Once HCI storage pool controller 121 receives an iSER packet (e.g., such as the extended iSER packet 453), it parses the packet and forms a list of target buffer entries comprising the payload portion, identifies the keys in the list (step 436) and then performs the I/O using the identified keys (step 438). For SCSI READs, the 'RDMA_WRITE' operation forms a chained work request for each of the participating UVM buffers to move the HCI storage pool controller data directly to this UVM's memory, and independent of any kernel implementation. For SCSI WRITEs, the 'RDMA_READ' operation forms a chained work request for each of the participating UVM buffers to move the data directly from UVM memory to the HCI storage pool controller's memory, independent of any kernel implementation.

As can now be understood from the foregoing techniques of FIG. 4B1, FIG. 4B2, and FIG. 4B3, implementation of one or more of the foregoing techniques facilitates high-performance RDMA calls that accesses I/O data directly from the address space of a virtual machine. More specifically, through implementation of one or more of the foregoing techniques, a virtual machine of a virtualization environment can seize advantages that arise from making RDMA calls that do not copy I/O data from user space to kernel space. The foregoing techniques facilitate high-performance RDMA that can be applied in high-availability computing systems. One such high-availability computing system involving storage pool data replication is shown and described as pertains to FIG. 5.

Figure 5:
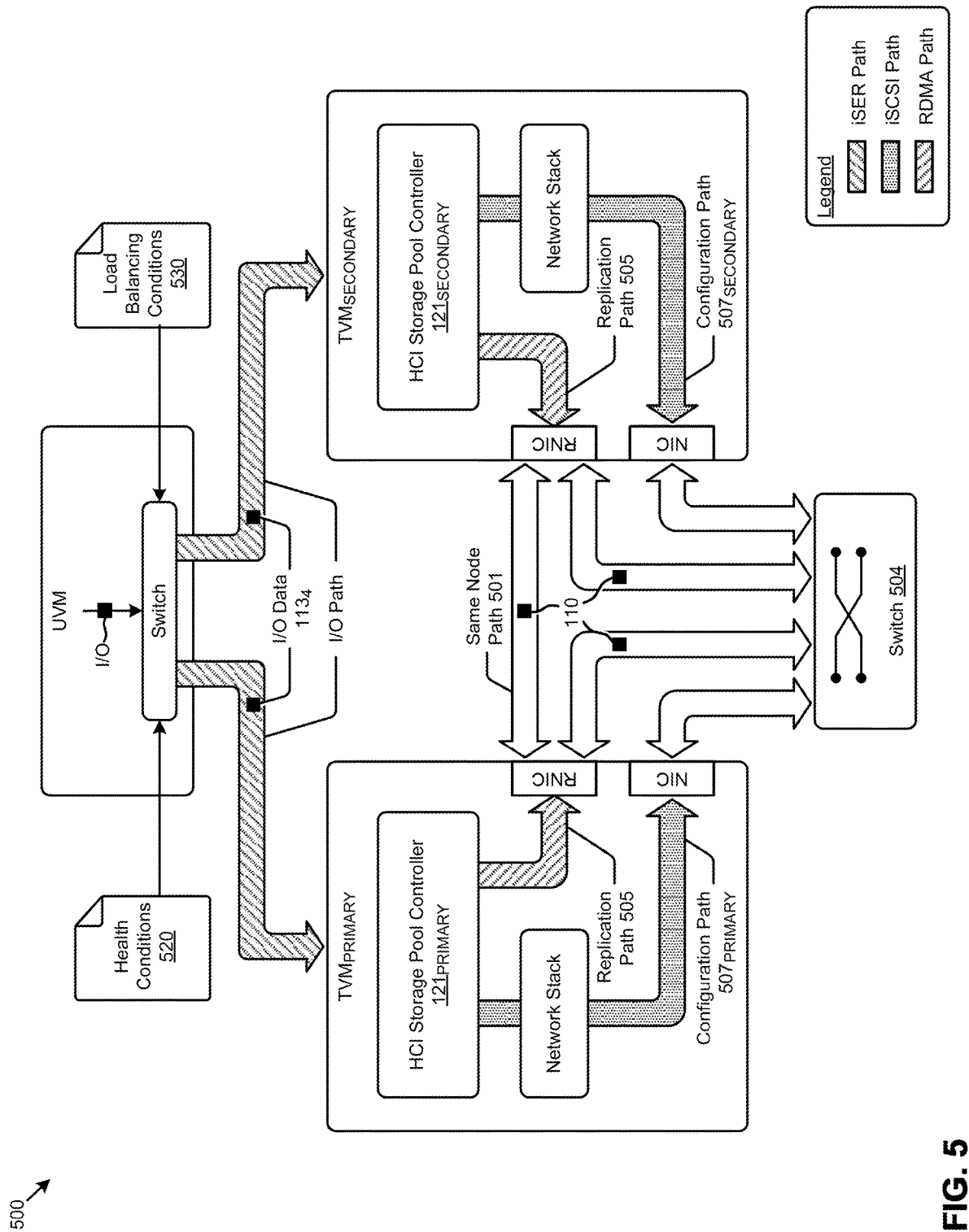
FIG. 5 illustrates a storage pool data replication system that implements an RDMA-implemented replication path in combination with an iSCSI configuration path, according to an embodiment.

FIG. 5 illustrates a storage pool data replication system that implements an RDMA-implemented replication path in combination with an iSCSI configuration path. As an option, one or more variations of storage pool data replication system 500 or any aspect thereof may be implemented in the context of the architecture and functionality of the embodiments described herein and/or in any environment.

The foregoing techniques for high-performance RDMA I/O operations can be implemented when communicating over an RDMA link that is situated between two different storage pool controllers. As shown, a first HCI storage pool controller $121_{PRIMARY}$ (e.g., hosted by $TVM_{PRIMARY}$) can communicate with a second HCI storage pool controller $121_{SECONDARY}$ (e.g., hosted by $TVM_{SECONDARY}$). Moreover, a first HCI storage pool controller $121_{PRIMARY}$ can be situated on a first node, whereas a second HCI storage pool controller $121_{SECONDARY}$ can be situated on a second node. I/O data can be directed by a UVM to be sent to either the first node or the second node. The determination as where to send any particular I/O can be based on health conditions 520 pertaining to the first and second nodes and/or, the determination as where to send any particular I/O can be based on load balancing conditions 530 pertaining to the first and second nodes.

In some configurations, both the first HCI storage pool controller $121_{PRIMARY}$ and the second HCI storage pool controller $121_{SECONDARY}$ are situated on the same node. In this single node configuration, with two storage pool controllers, the same node path 501 is used to carry out the RDMA I/O. In other configurations, the first HCI storage pool controller $121_{PRIMARY}$ and the second HCI storage pool controller $121_{SECONDARY}$ are situated on different nodes. In this configuration, paths through the switch 504 are used to facilitate initiation of the RDMA I/O. Configuration protocols, including memory pre-registration are carried out over the shown configuration paths (configuration path $507_{PRIMARY}$, and configuration path $507_{SECONDARY}$). Replication of I/O data over RDMA is carried out over the shown replication paths (e.g., replication path 505 of $TVM_{PRIMARY}$, and replication path 505 of $TVM_{SECONDARY}$).

System Architecture Overview

Additional System Architecture Examples

All or portions of any of the foregoing techniques can be partitioned into one or more modules and instanced within, or as, or in conjunction with, a virtualized controller in a virtual computing environment. Some example instances within various virtual computing environments are shown and discussed as pertains to FIG. 6A, FIG. 6B, FIG. 6C, and FIG. 6D.

Figure 6A:
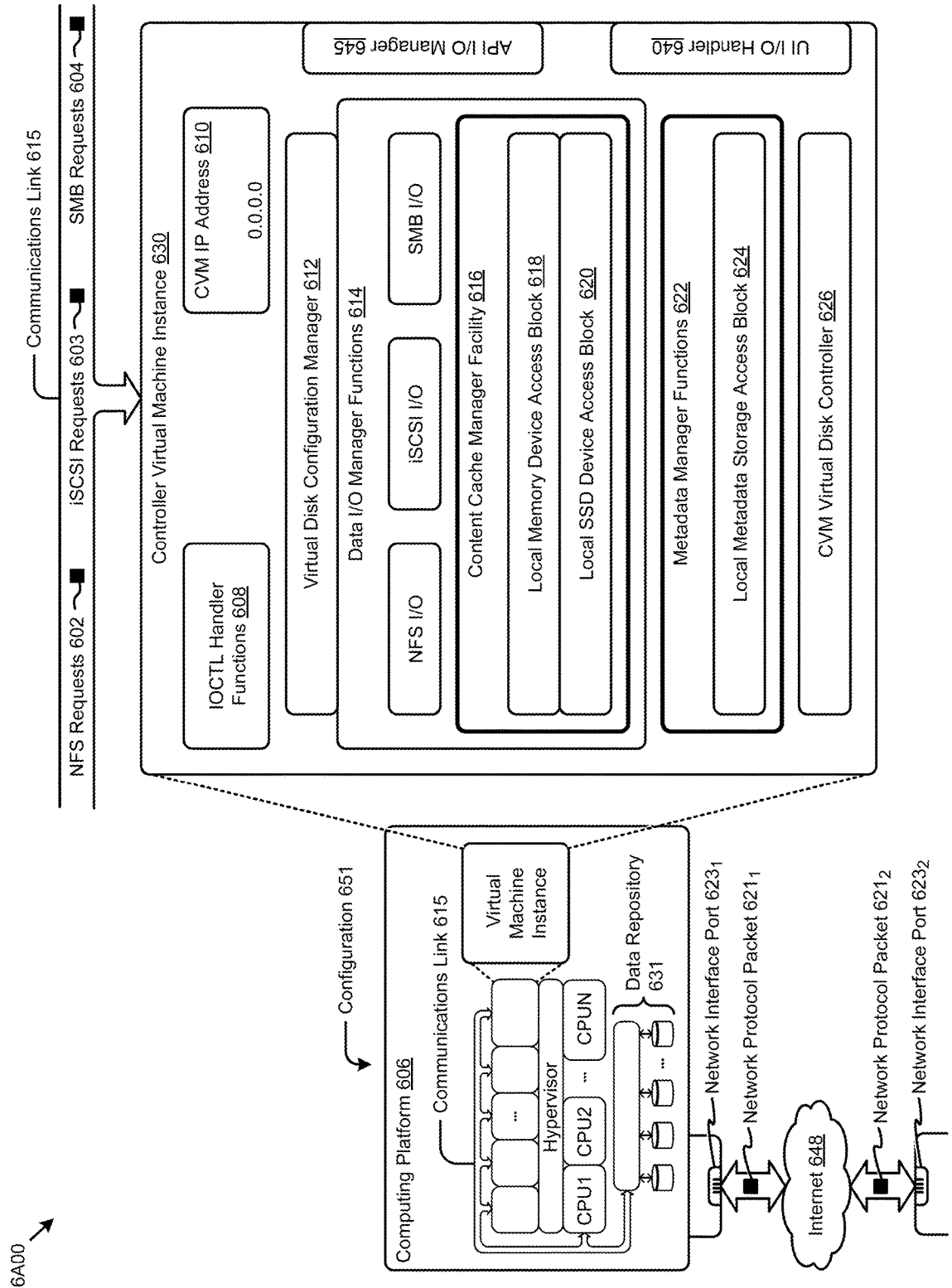
FIG. 6A, FIG. 6B, FIG. 6C, and FIG. 6D depict virtualization system architectures comprising collections of interconnected components suitable for implementing embodiments of the present disclosure and/or for use in the herein-described environments.

FIG. 6A depicts a virtualized controller as implemented in the shown virtual machine architecture 6A00. The heretofore-disclosed embodiments, including variations of any virtualized controllers, can be implemented in distributed systems where a plurality of networked-connected devices communicate and coordinate actions using inter-component messaging.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 6A00 comprises a collection of interconnected components suitable for implementing embodiments of the present disclosure and/or for use in the herein-described environments. Moreover, virtual machine architecture 6A00 includes a virtual machine instance in configuration 651 that is further described as pertaining to controller virtual machine instance 630. Configuration 651 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 630.

In this and other configurations, a controller virtual machine instance receives block I/O storage requests as network file system (NFS) requests in the form of NFS requests 602, and/or internet small computer storage interface (iSCSI) block IO requests in the form of iSCSI requests 603, and/or Samba file system (SMB) requests in the form of SMB requests 604. The controller virtual machine (CVM)

instance publishes and responds to an internet protocol (IP) address (e.g., CVM IP address 610). Various forms of input and output can be handled by one or more IO control handler functions (e.g., IOCTL handler functions 608) that interface to other functions such as data IO manager functions 614 and/or metadata manager functions 622. As shown, the data IO manager functions can include communication with virtual disk configuration manager 612 and/or can include direct or indirect communication with any of various block IO functions (e.g., NFS TO, iSCSI TO, SMB TO, etc.).

In addition to block TO functions, configuration 651 supports IO of any form (e.g., block TO, streaming TO, packet-based TO, HTTP traffic, etc.) through either or both of a user interface (UI) handler such as UI IO handler 640 and/or through any of a range of application programming interfaces (APIs), possibly through API TO manager 645.

Communications link 615 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 630 includes content cache manager facility 616 that accesses storage locations, possibly including local dynamic random access memory (DRAM) (e.g., through local memory device access block 618) and/or possibly including accesses to local solid state storage (e.g., through local SSD device access block 620).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 631, which in turn can be formatted into any one or more storage areas, and which can comprise parameterized storage accessible by a key (e.g., a filename, a table name, a block address, an offset address, etc.). Data repository 631 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 624. The data repository 631 can be configured using CVM virtual disk controller 626, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 651 can be coupled by communications link 615 (e.g., backplane, LAN, PSTN, wired or wireless network, etc.) and each instance may perform respective portions of sequences of instructions as may be required to practice embodiments of the disclosure.

The shown computing platform 606 is interconnected to the Internet 648 through one or more network interface ports (e.g., network interface port $623_1$ and network interface port $623_2$). Configuration 651 can be addressed through one or more network interface ports using an IP address. Any operational element within computing platform 606 can perform sending and receiving operations using any of a range of network protocols, possibly including network protocols that send and receive packets (e.g., network protocol packet $621_1$ and network protocol packet $621_2$).

Computing platform 606 may transmit and receive messages that can be composed of configuration data and/or any other forms of data and/or instructions organized into a data structure (e.g., communications packets). In some cases, the data structure includes program instructions (e.g., application code) communicated through the Internet 648 and/or through any one or more instances of communications link 615. Received program instructions may be processed and/or executed by a CPU as it is received and/or program instructions may be stored in any volatile or non-volatile storage for later execution. Program instructions can be transmitted via an upload (e.g., an upload from an access device over the Internet 648 to computing platform 606). Further, program instructions and/or the results of executing program instructions can be delivered to a particular user via a download (e.g., a download from computing platform 606 over the Internet 648 to an access device).

Configuration 651 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to reducing or eliminating overhead-incurring operations in the RDMA path. In some embodiments, a module may include one or more state machines and/or combinational logic used to implement or facilitate the operational and/or performance characteristics pertaining to reducing or eliminating overhead-incurring operations in the RDMA path.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of reducing or eliminating overhead-incurring operations in the RDMA path). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to reducing or eliminating overhead-incurring operations in the RDMA path, and/or for improving the way data is manipulated when performing computerized operations pertaining to configuring RDMA connections between virtual machines so as to facilitate high-performance memory registration for RDMA I/O operations without requiring user intervention.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT" issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT" issued on Oct. 1, 2013, which is hereby incorporated by reference in its entirety.

Figure 6B:
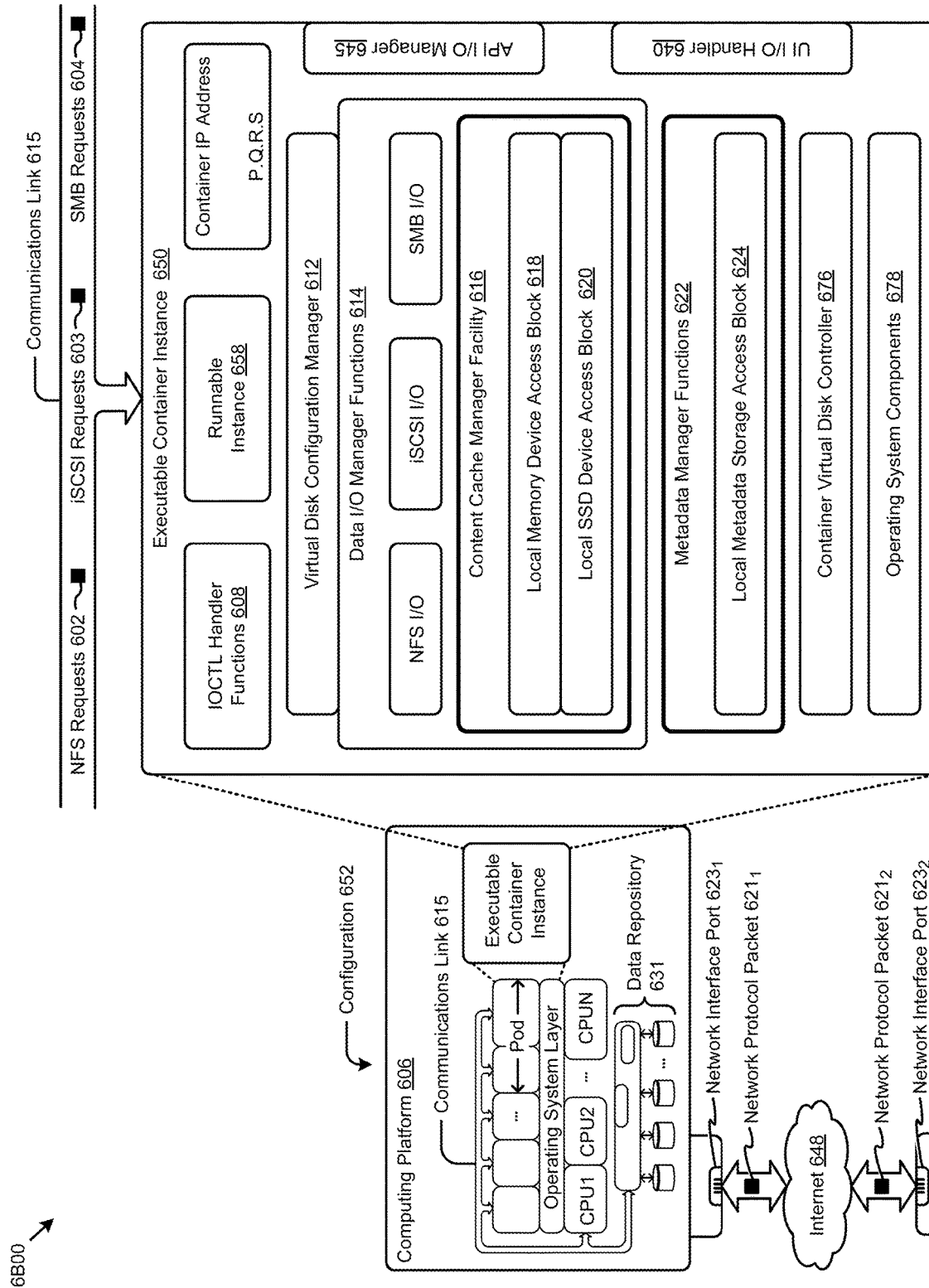

FIG. 6B depicts a virtualized controller implemented by containerized architecture 6B00. The containerized architecture comprises a collection of interconnected components suitable for implementing embodiments of the present disclosure and/or for use in the herein-described environments. Moreover, the shown containerized architecture 6B00 includes an executable container instance in configuration 652 that is further described as pertaining to executable container instance 650. Configuration 652 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 650). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls", "dir", etc.). The executable container might optionally include operating system components 678, however such a separate set of operating system components need not be provided. As an alternative, an executable container can include runnable instance 658, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 676. Such a container virtual disk controller can perform any of the functions that the aforementioned CVM virtual disk controller 626 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 6C:
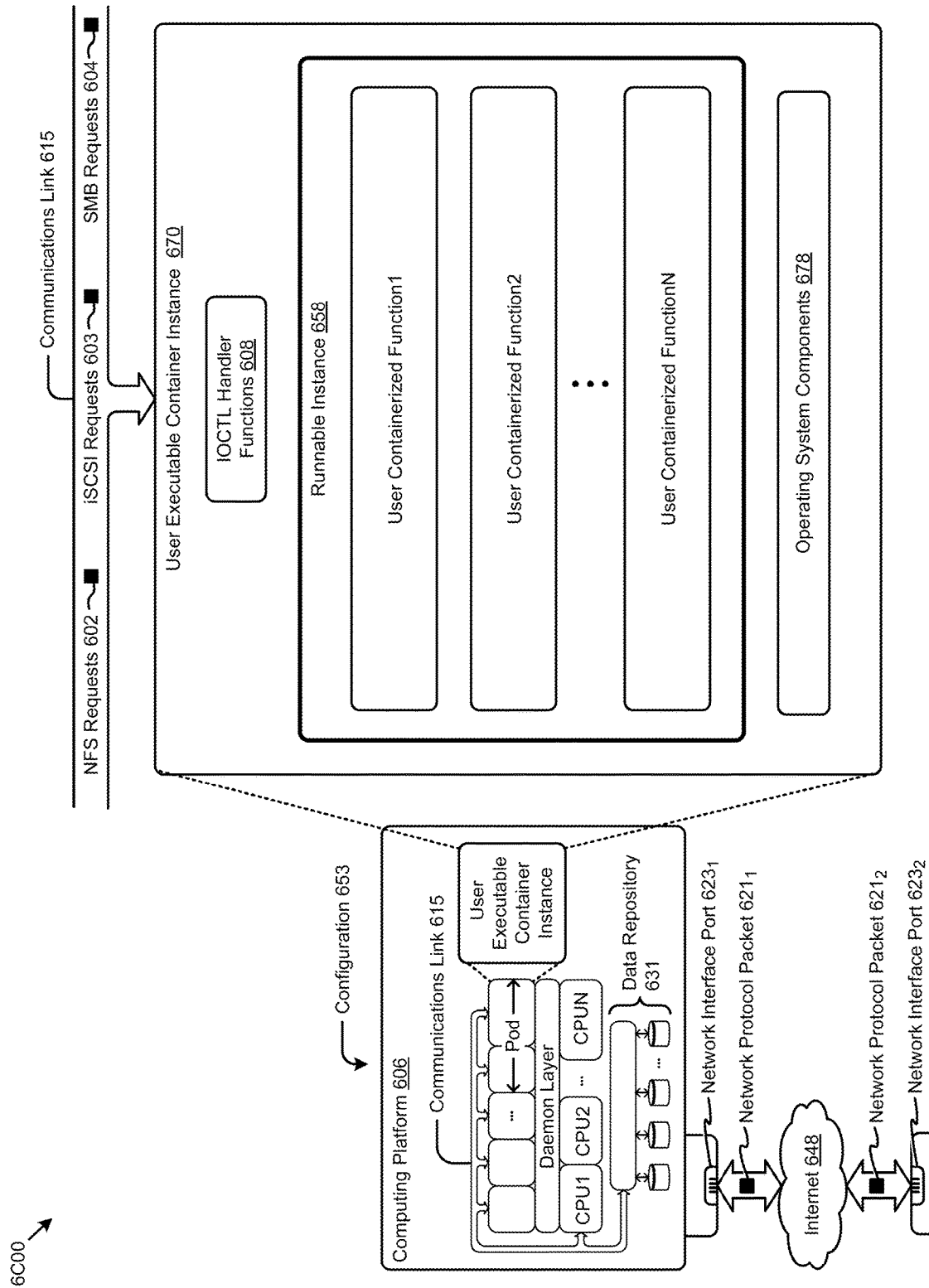

FIG. 6C depicts a virtualized controller implemented by a daemon-assisted containerized architecture 6C00. The containerized architecture comprises a collection of interconnected components suitable for implementing embodiments of the present disclosure and/or for use in the herein-described environments. Moreover, the shown daemon-assisted containerized architecture includes a user executable container instance in configuration 653 that is further described as pertaining to user executable container instance 670. Configuration 653 includes a daemon layer (as shown) that performs certain functions of an operating system.

User executable container instance 670 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 658). In some cases, the shown operating system components 678 comprise portions of an operating system, which portions are interfaced with or included in the runnable instance and/or any user containerized functions. In this embodiment of a daemon-assisted containerized architecture, the computing platform 606 might or might not host operating system components other than operating system components 678. More specifically, the shown daemon might or might not host operating system components other than operating system components 678 of user executable container instance 670.

The virtual machine architecture 6A00 of FIG. 6A and/or the containerized architecture 6B00 of FIG. 6B and/or the daemon-assisted containerized architecture 6C00 of FIG. 6C can be used in any combination to implement a distributed platform that contains multiple servers and/or nodes that manage multiple tiers of storage where the tiers of storage might be formed using the shown data repository 631 and/or any forms of network accessible storage. As such, the multiple tiers of storage may include storage that is accessible over communications link 615. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 651 of FIG. 6A) to manage the interactions between the underlying hardware and user virtual machines or containers that run client software.

Distinct from user virtual machines or user executable containers, a special controller virtual machine (e.g., as depicted by controller virtual machine instance 630) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 6D:
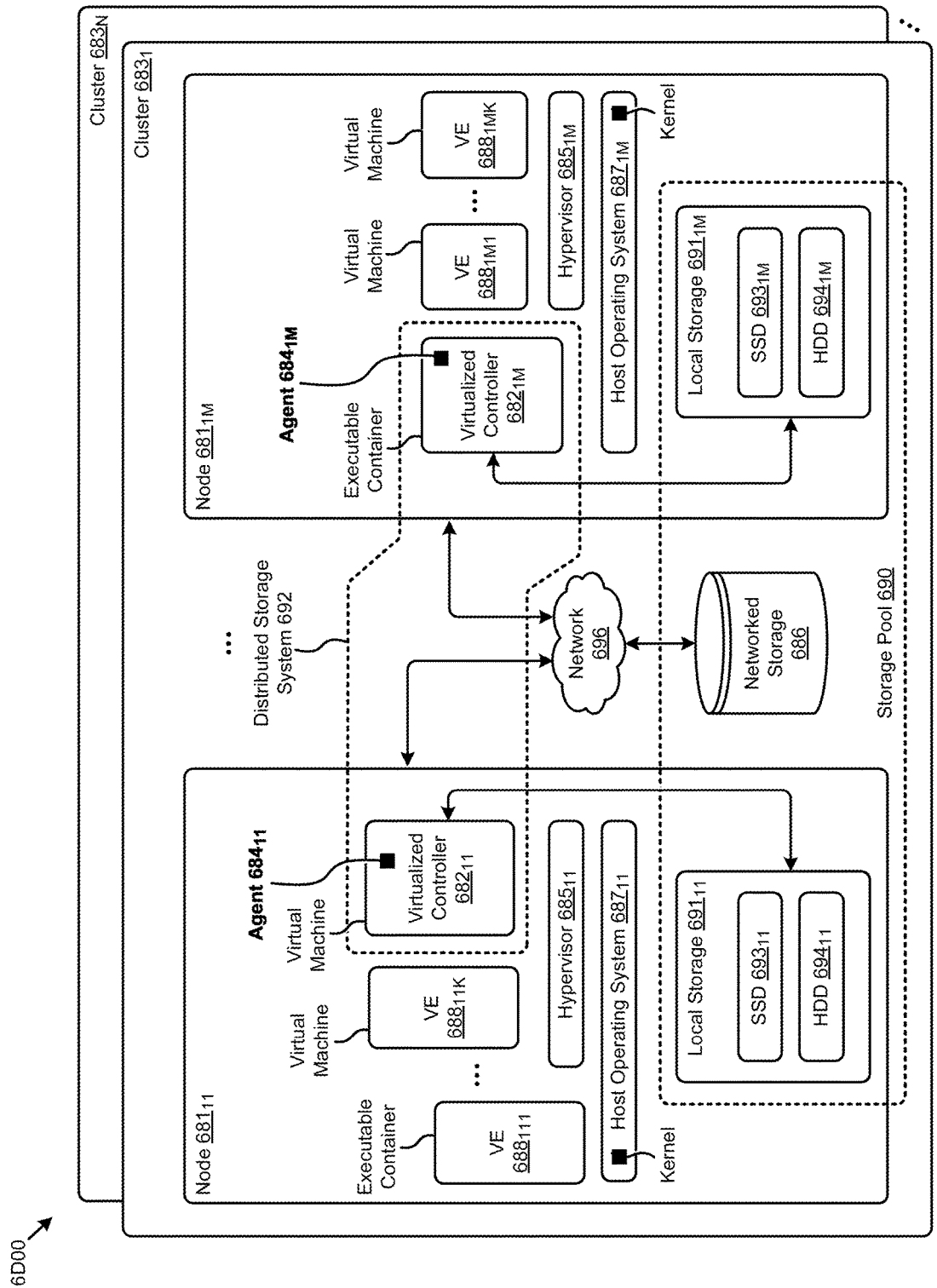

FIG. 6D depicts a distributed virtualization system in a multi-cluster environment 6D00. The shown distributed virtualization system is configured to be used to implement the herein disclosed techniques. Specifically, the distributed virtualization system of FIG. 6D comprises multiple clusters (e.g., cluster $683_1$, ..., cluster $683_N$) comprising multiple nodes that have multiple tiers of storage in a storage pool. Representative nodes (e.g., node $681_{11}$, ..., node $681_{1M}$) and storage pool 690 associated with cluster $683_1$ are shown. Each node can be associated with one server, multiple servers, or portions of a server. The nodes can be associated (e.g., logically and/or physically) with the clusters. As shown, the multiple tiers of storage include storage that is accessible through a network 696, such as a networked storage 686 (e.g., a storage area network or SAN, network attached storage or NAS, etc.). The multiple tiers of storage further include instances of local storage (e.g., local storage $691_{11}$, ..., local storage $691_{1M}$). For example, the local storage can be within or directly attached to a server and/or appliance associated with the nodes. Such local storage can include solid state drives (SSD $693_{11}$, ..., SSD $693_{1M}$), hard disk drives (HDD $694_{11}$, ..., HDD $694_{1M}$), and/or other storage devices.

As shown, any of the nodes of the distributed virtualization system can implement one or more user virtualized entities (e.g., VE $688_{111}$, ..., VE $688_{11K}$, ..., VE $688_{1M1}$, ..., VE $688_{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $687_{11}$, ..., host operating system $687_{1M}$), while the VMs run multiple applications on various respective guest operating systems. Such flexibility can be facilitated at least in part by a hypervisor (e.g., hypervisor $685_{11}$, hypervisor $685_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers comprise groups of processes and/or resources (e.g., memory, CPU, disk, etc.) that are isolated from the node host computer and other containers. Such executable containers directly interface with the kernel of the host operating system (e.g., host operating system $687_{11}$, ..., host operating system $687_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 690 by the VMs and/or the executable containers.

Multiple instances of such virtualized controllers can coordinate within a cluster to form the distributed storage system 692 which can, among other operations, manage the storage pool 690. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $681_{11}$ can interface with a controller virtual machine (e.g., virtualized controller $682_{11}$) through hypervisor $685_{11}$ to access data of storage pool 690. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 692. For example, a hypervisor at one node in the distributed storage system 692 might correspond to software from a first vendor, and a hypervisor at another node in the distributed storage system 692 might correspond to a second software vendor. As another virtualized controller implementation example, executable containers can be used to implement a virtualized controller (e.g., virtualized controller $682_{1M}$) in an operating system virtualization environment at a given node. In this case, for example, the virtualized entities at node $681_{1M}$ can access the storage pool 690 by interfacing with a controller container (e.g., virtualized controller $682_{1M}$) through hypervisor $685_{1M}$ and/or the kernel of host operating system $687_{1M}$.

In certain embodiments, one or more instances of an agent can be implemented in the distributed storage system 692 to facilitate the herein disclosed techniques. Specifically, agent $684_{11}$ can be implemented in the virtualized controller $682_{11}$, and agent $684_{1M}$ can be implemented in the virtualized controller $682_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Solutions attendant to configuring RDMA connections between virtual machines so as to facilitate high-performance memory registration for RDMA I/O operations without requiring user intervention can be brought to bear through implementation of any one or more of the foregoing embodiments. Moreover, any aspect or aspects of reducing or eliminating overhead-incurring operations in the RDMA when communicating storage commands between virtual machines can be implemented in the context of the foregoing environments.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor cause the processor to perform acts comprising:
    registering a contiguous unit of memory to use in a remote direct memory access (RDMA) data transfer, wherein the contiguous unit of memory comprises a memory portion registered with an RDMA network interface card (NIC) using a non-RDMA communication path;
    configuring the RDMA NIC based on an input/output (I/O) operation that is performed prior to initiating an I/O request; and
    initiating the RDMA data transfer through the RDMA NIC to a hyperconverged computing infrastructure (HCI) storage pool controller using the contiguous unit of memory.

2. The non-transitory computer readable medium of claim 1, wherein a plurality of portions of the contiguous unit of memory are registered using a using a configuration path other than an RDMA path.

3. The non-transitory computer readable medium of claim 1, wherein the at least a portion of the contiguous unit of memory corresponds to a base memory region of a virtual machine.

4. The non-transitory computer readable medium of claim 1, wherein a plurality of portions of the contiguous unit of memory are registered in a batch.

5. The non-transitory computer readable medium of claim 1, wherein both a virtual machine and the HCI storage pool controller are in a user space of a virtualization environment.

6. The non-transitory computer readable medium of claim 5 further comprising instructions which, when stored in memory and executed by the processor cause the processor to perform further acts of:
    initiating, through a virtual function of an RDMA NIC, an I/O request from the virtual machine in the user space to another virtual machine in the user space of the virtualization environment.

7. The non-transitory computer readable medium of claim 5, wherein configuring the RDMA NIC comprises configuring a virtual function of an RDMA NIC, the I/O operation comprises an iSCSI I/O operation, and the I/O request is initiated by the virtual machine.

8. The non-transitory computer readable medium of claim 5, wherein a virtual function of an RDMA NIC that is used to expose at least one RDMA function to the virtual machine is not a paravirtualized function of the RDMA NIC.

9. The non-transitory computer readable medium of claim 1, wherein a first single virtual function of an RDMA NIC is accessed by a plurality of user virtual machines participating in iSER communications with the HCI storage pool controller.

10. The non-transitory computer readable medium of claim 9, wherein a second single virtual function is accessed by the HCI storage pool controller to receive traffic of the plurality of user virtual machines.

11. A method comprising:
    registering a contiguous unit of memory to use in a remote direct memory access (RDMA) data transfer, wherein the contiguous unit of memory comprises a memory portion registered with an RDMA network interface card (NIC) using a non-RDMA communication path;
    configuring the RDMA NIC based on an input/output (I/O) operation that is performed prior to initiating an I/O request; and
    initiating the RDMA data transfer through the RDMA NIC to a hyperconverged computing infrastructure (HCI) storage pool controller using the contiguous unit of memory.

12. The method of claim 11, wherein a plurality of portions of the contiguous unit of memory are registered using a using a configuration path other than an RDMA path.

13. The method of claim 11, wherein the at least a portion of the contiguous unit of memory corresponds to a base memory region of a virtual machine.

14. The method of claim 11, wherein a plurality of portions of the contiguous unit of memory are registered in a batch.

15. The method of claim 11, wherein both a virtual machine and the HCI storage pool controller are in a user space of a virtualization environment.

16. The method of claim 15 further comprising:
    initiating, through a virtual function of an RDMA NIC, an I/O request from the virtual machine in the user space to another virtual machine in the user space of the virtualization environment.

17. The method of claim 15, wherein configuring the RDMA NIC comprises configuring a virtual function of an RDMA NIC, the I/O operation comprises an iSCSI I/O operation, and the I/O request is initiated by the virtual machine.

18. The method of claim 15, wherein a virtual function of an RDMA NIC that is used to expose at least one RDMA function to the virtual machine is not a paravirtualized function of the RDMA NIC.

19. The method of claim 11, wherein a first single virtual function of an RDMA NIC is accessed by a plurality of user virtual machines participating in iSER communications with the HCI storage pool controller.

20. The method of claim 19, wherein a second single virtual function is accessed by the HCI storage pool controller to receive traffic of the plurality of user virtual machines.

21. A system comprising:
    a storage medium having stored thereon a sequence of instructions; and
    a processor that executes the sequence of instructions to cause the processor to perform acts comprising,
        registering a contiguous unit of memory to use in a remote direct memory access (RDMA) data transfer, wherein the contiguous unit of memory comprises a memory portion registered with an RDMA network interface card (NIC) using a non-RDMA communication path;

configuring the RDMA NIC based on an input/output (I/O) operation that is performed prior to initiating an I/O request; and initiating the RDMA data transfer through the RDMA NIC to a hyperconverged computing infrastructure (HCI) storage pool controller using the contiguous unit of memory.

22. The system of claim 21, wherein a plurality of portions of the contiguous unit of memory are registered using a using a configuration path other than an RDMA path.

23. The system of claim 21, wherein the at least a portion of the contiguous unit of memory corresponds to a base memory region of a virtual machine.

24. The system of claim 21, wherein a plurality of portions of the contiguous unit of memory are registered in a batch.

25. The system of claim 21, wherein both a virtual machine and the HCI storage pool controller are in a user space of a virtualization environment.

26. The system of claim 25 further comprising instructions which, when stored in memory and executed by the processor cause the processor to perform further acts of:

initiating, through a virtual function of an RDMA NIC, an I/O request from the virtual machine in the user space to another virtual machine in the user space of the virtualization environment.

27. The system of claim 25, wherein configuring the RDMA NIC comprises configuring a virtual function of an RDMA NIC, the I/O operation comprises an iSCSI I/O operation, and the I/O request is initiated by the virtual machine.

28. The system of claim 25, wherein a virtual function of an RDMA NIC that is used to expose at least one RDMA function to the virtual machine is not a paravirtualized function of the RDMA NIC.

29. The system of claim 21, wherein a first single virtual function of an RDMA NIC is accessed by a plurality of user virtual machines participating in iSER communications with the HCI storage pool controller.

30. The system of claim 29, wherein a second single virtual function is accessed by the HCI storage pool controller to receive traffic of the plurality of user virtual machines.

* * * * *